(12) United States Patent
Fujii

(10) Patent No.: US 6,985,729 B2
(45) Date of Patent: Jan. 10, 2006

(54) WIRELESS COMMUNICATION APPARATUS

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 09/904,628

(22) Filed: Jul. 13, 2001

(65) Prior Publication Data

US 2002/0009995 A1 Jan. 24, 2002

(30) Foreign Application Priority Data

Jul. 13, 2000 (JP) ......................... 2000-212821

(51) Int. Cl.
H04Q 7/20 (2006.01)
H04M 1/66 (2006.01)

(52) U.S. Cl. .................. 455/435.1; 455/411; 455/456.4
(58) Field of Classification Search ................ 455/411, 455/421, 435.1, 435.2, 456.4, 456.1, 435.3
See application file for complete search history.

(56) References Cited

U.S. PATENT DOCUMENTS

| | | | |
|---|---|---|---|
| 5,598,150 A | | 1/1997 | Suzuki et al. |
| 5,771,457 A | | 6/1998 | Tsutsui |
| 5,790,955 A | | 8/1998 | Tomoike .................... 455/453 |
| 5,978,670 A | * | 11/1999 | Casoli et al. ............... 455/411 |
| 6,128,485 A | * | 10/2000 | Mori et al. .............. 455/422.1 |
| 6,233,447 B1 | * | 5/2001 | Tomoike ..................... 455/411 |
| 6,253,081 B1 | * | 6/2001 | Koster ........................ 455/433 |
| 6,253,095 B1 | * | 6/2001 | Ushida ....................... 455/565 |
| 6,311,055 B1 | * | 10/2001 | Boltz ...................... 455/414.1 |
| 6,324,399 B1 | | 11/2001 | Salmivalli .................... 455/433 |
| 6,356,772 B1 | * | 3/2002 | Choi .......................... 455/564 |
| 6,411,807 B1 | * | 6/2002 | Amin et al. ............. 455/432.3 |
| 6,438,375 B1 | * | 8/2002 | Muller .................... 455/435.3 |
| 6,466,786 B1 | * | 10/2002 | Wallenius .................... 455/433 |

FOREIGN PATENT DOCUMENTS

| | | |
|---|---|---|
| EP | 0 472 349 B1 | 2/1992 |
| JP | 9-18962 | 1/1997 |
| JP | 10-56670 | 2/1998 |
| JP | 10-243467 | 9/1998 |
| JP | 11-68944 | 3/1999 |

* cited by examiner

Primary Examiner—Simon Nguyen
(74) Attorney, Agent, or Firm—Morgan & Finnegan, LLP

(57) ABSTRACT

A base station is connected via a public line to a host. The base station transmits a restriction notification signal in response to a request issued from the host. When a wireless terminal apparatus whose subscriber registration operation has already been completed receives the restriction notification signal, the operation mode of this wireless terminal apparatus is brought into a restriction mode. The wireless terminal apparatus returns a disconnect display in the restriction mode in response to a call out request issued from a main board. When a wireless terminal apparatus whose subscriber registration operation has not yet been completed receives the restriction notification signal, this wireless terminal apparatus executes a subscriber registration sequence between the wireless terminal apparatus and the base station.

27 Claims, 19 Drawing Sheets

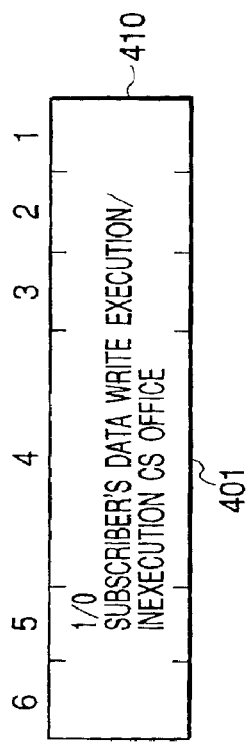
FIG. 4B
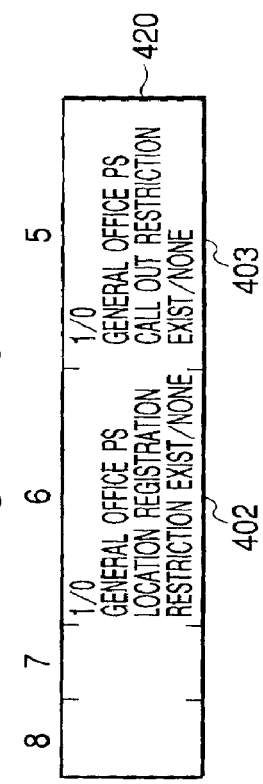
FIG. 4C
FIG. 4A

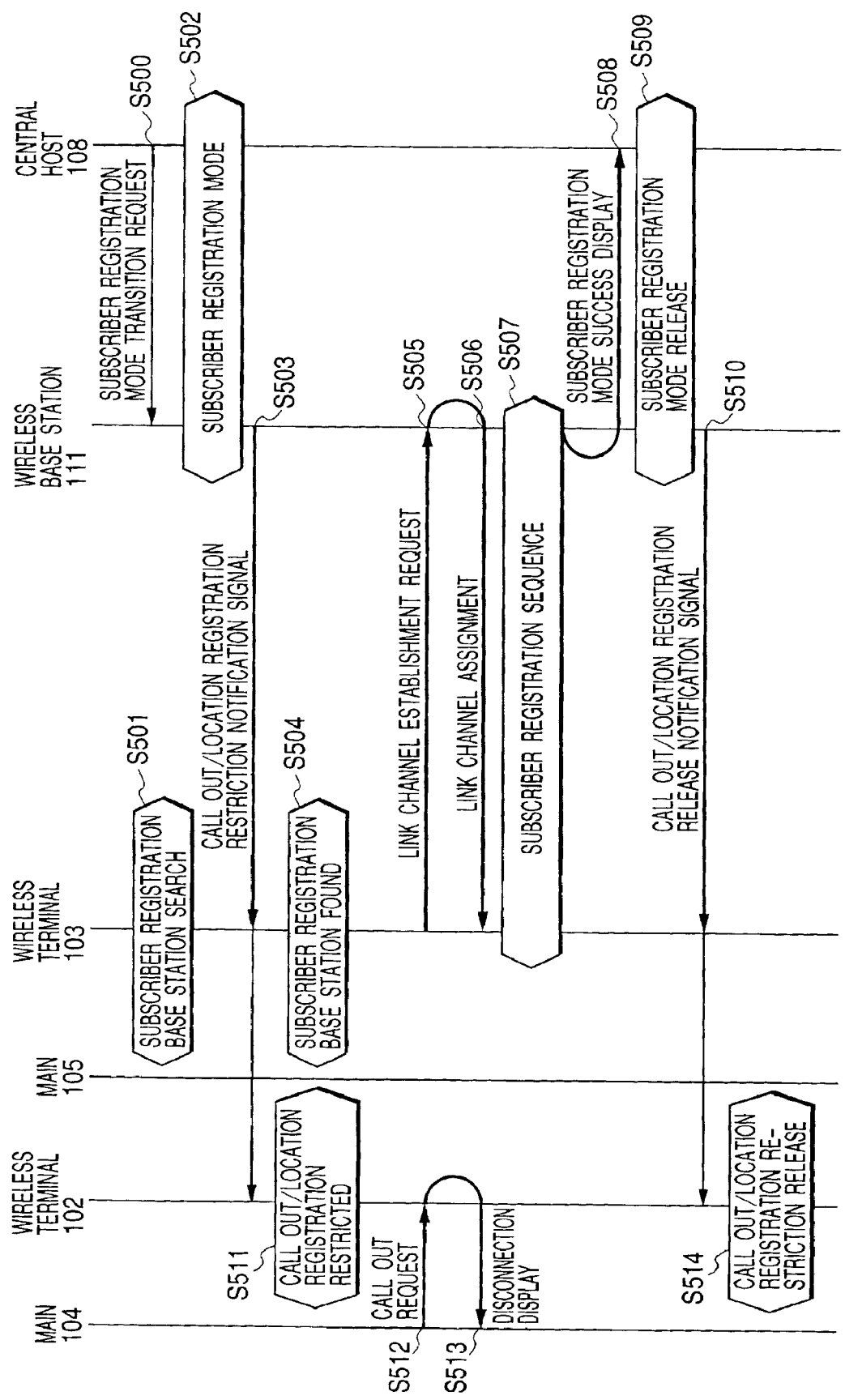

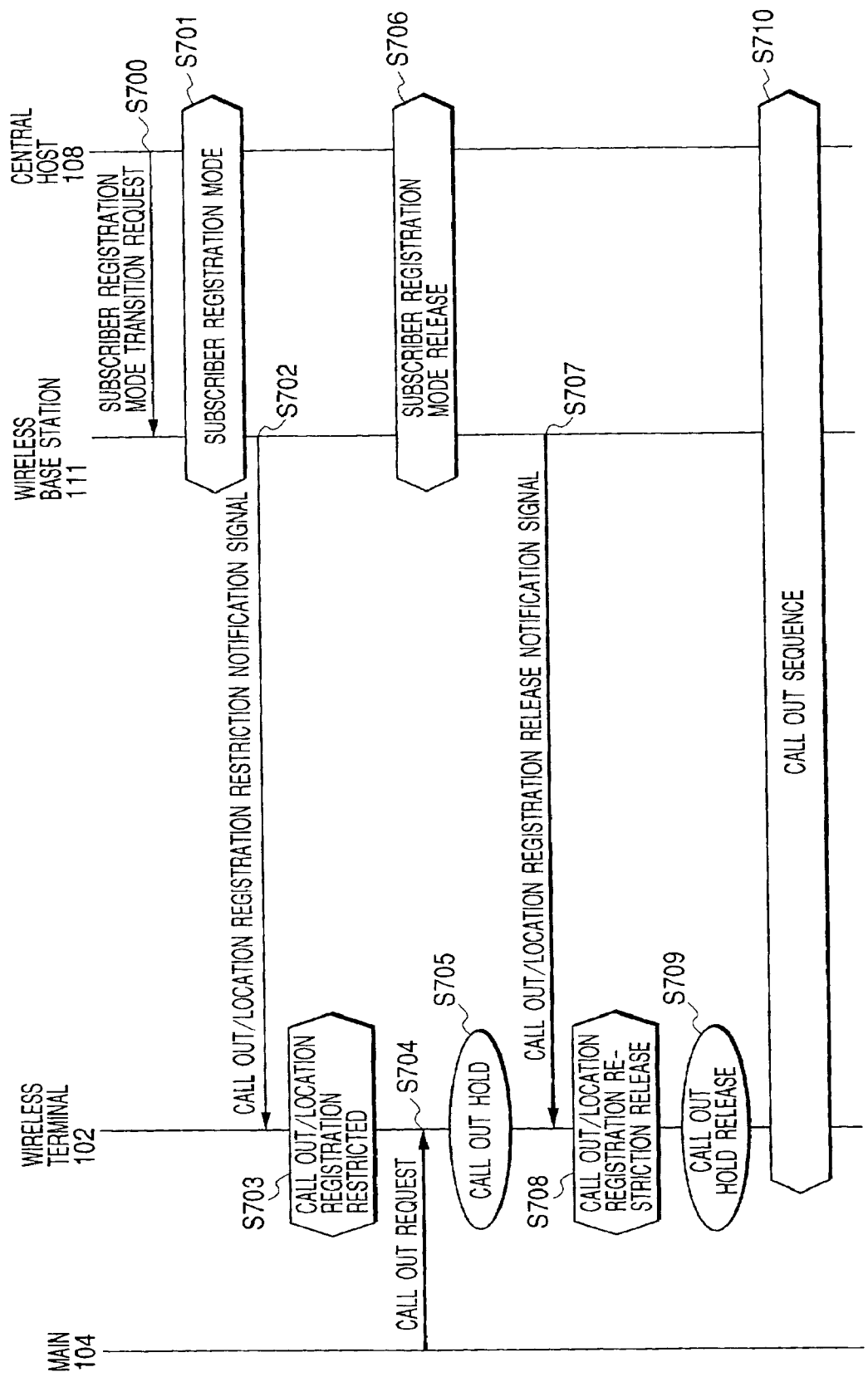

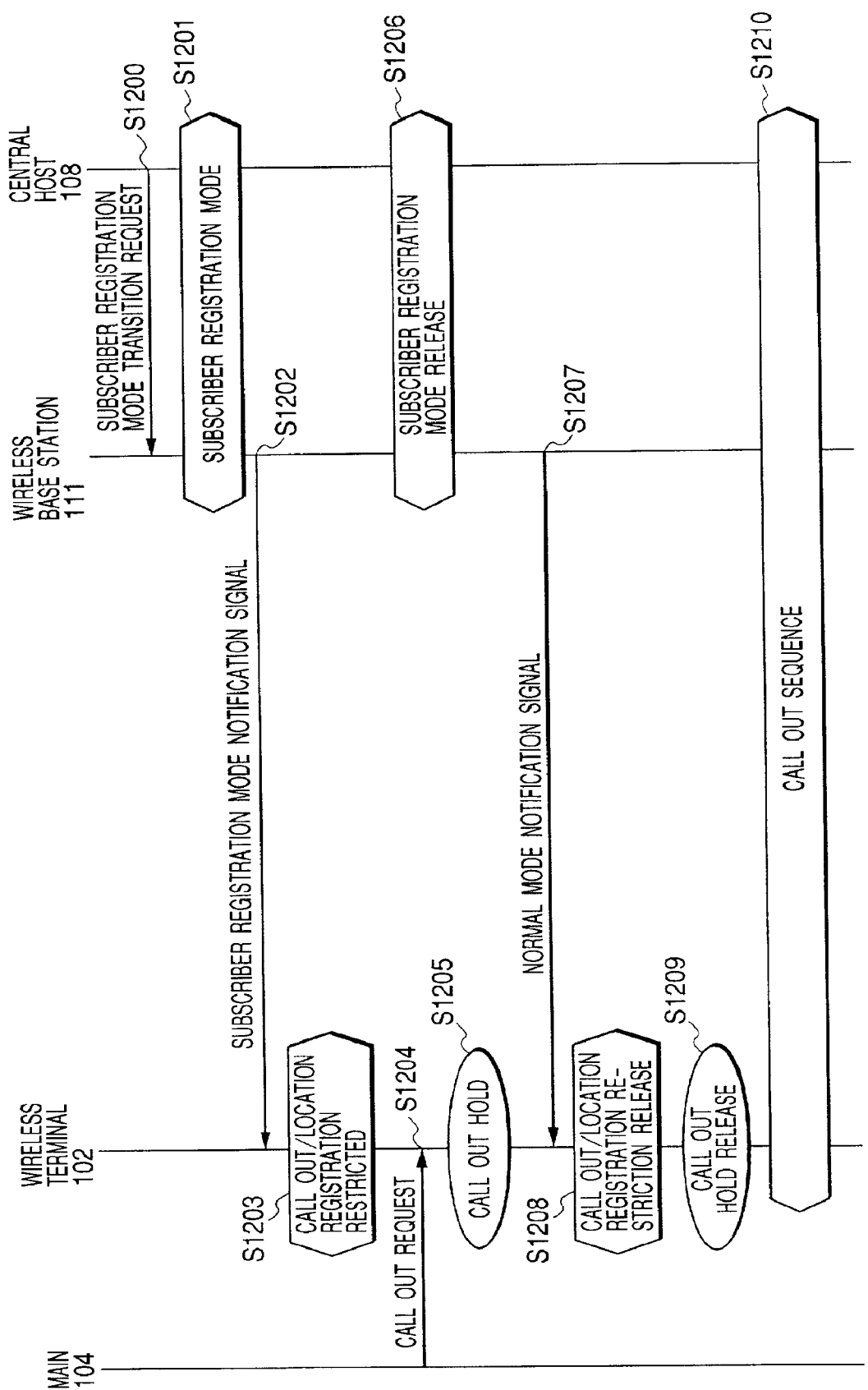

WIRELESS COMMUNICATION APPARATUS

BACKGROUND OF THE INVENTION

1. Field of the Invention

The present invention is related to a wireless communication apparatus.

2. Related Background Art

While application ranges of wireless communication systems such as PHS (Personal Handy phone System), especially, a private system are gradually expanded, these wireless communication systems may be frequently utilized in communication units of office-use appliances.

In such a wireless communication system, in order that a wireless terminal apparatus can be utilized in the wireless communication system, the wireless terminal apparatus must be registered as a subscriber into this wireless communication system.

A wireless base station, however, may not respond to a signal from the wireless terminal apparatus which is executing subscriber registration sequence, during responding to a signal from the wireless terminal apparatus which is executing call-out or location registration sequence.

In particular, in the case where there are many wireless terminal apparatuses which have completed subscriber registration, there are many wireless terminal apparatuses which are executing call-out or location registration sequence, so that failure possibility of subscriber registration by a wireless terminal apparatus which have not been complete subscriber registration, has increased.

Moreover, if a wireless terminal apparatus is controlled to execute subscriber registration by a remote located host, the host may not know a reason for impossibility of subscriber registration.

SUMMARY OF THE INVENTION

It is an object of the invention to prevent another communication apparatus from interrupting a subscriber registration process executed between a base station and a communication apparatus.

Another object of the invention is that a base station sends signal to a communication apparatus, thereby preventing the above interrupt by another communication apparatus.

Still another object of the invention is to prevent another communication apparatus from interrupting a process executed by a base station in response to a request from a host connected via a public network.

A further object of the invention is to reduce load for executing a process related to a restricted request after completion of registration by unregistered communication apparatus, in case of restricting a request from a registered communication apparatus while unregistered communication apparatus executes registration process.

BRIEF DESCRIPTION OF THE DRAWINGS

For a better understanding of the present invention, reference is made of a detailed description to be read in conjunction with the accompanying drawings, in which:

FIGS. 4A, 4B and 4C illustratively show a structure of a notification signal transmitted by the wireless base station in the first embodiment;

FIG. 5 is a sequence diagram for describing operations of the wireless communication system according to the first embodiment of the present invention;

FIG. 7 is a sequence diagram for describing operations of a wireless communication system according to a second embodiment of the present invention;

FIG. 12 is a sequence diagram for describing operations of a wireless communication system according to a fourth embodiment of the present invention.

DETAILED DESCRIPTION OF THE PREFERRED EMBODIMENTS

Referring now to drawings, various embodiments of the present invention will be explained. It should be noted that in a present embodiment, the PHS (personal Handy phone system) is employed as the wireless communication system.

In this first embodiment, a wireless terminal apparatus whose subscriber registration has already been established may execute a transmission restriction (transmission control) based upon a notification signal transmitted when a wireless base station executes a subscriber registration operation.

It should be understood that while other wireless communication systems such as the PDC (personal digital cellular) system, the GSM (global system for mobile communications) system, the DECT (digital enhanced cordless telephone) system, the IS95 (interim standard-95) system, the CDMA-One system, and the W-CDMA system are employed instead of the above-explained PHS system, a wireless terminal apparatus which has already been registered may execute a transmission restriction based upon a notification transmitted when a wireless base station performs a subscriber registration operation.

Figure 1:
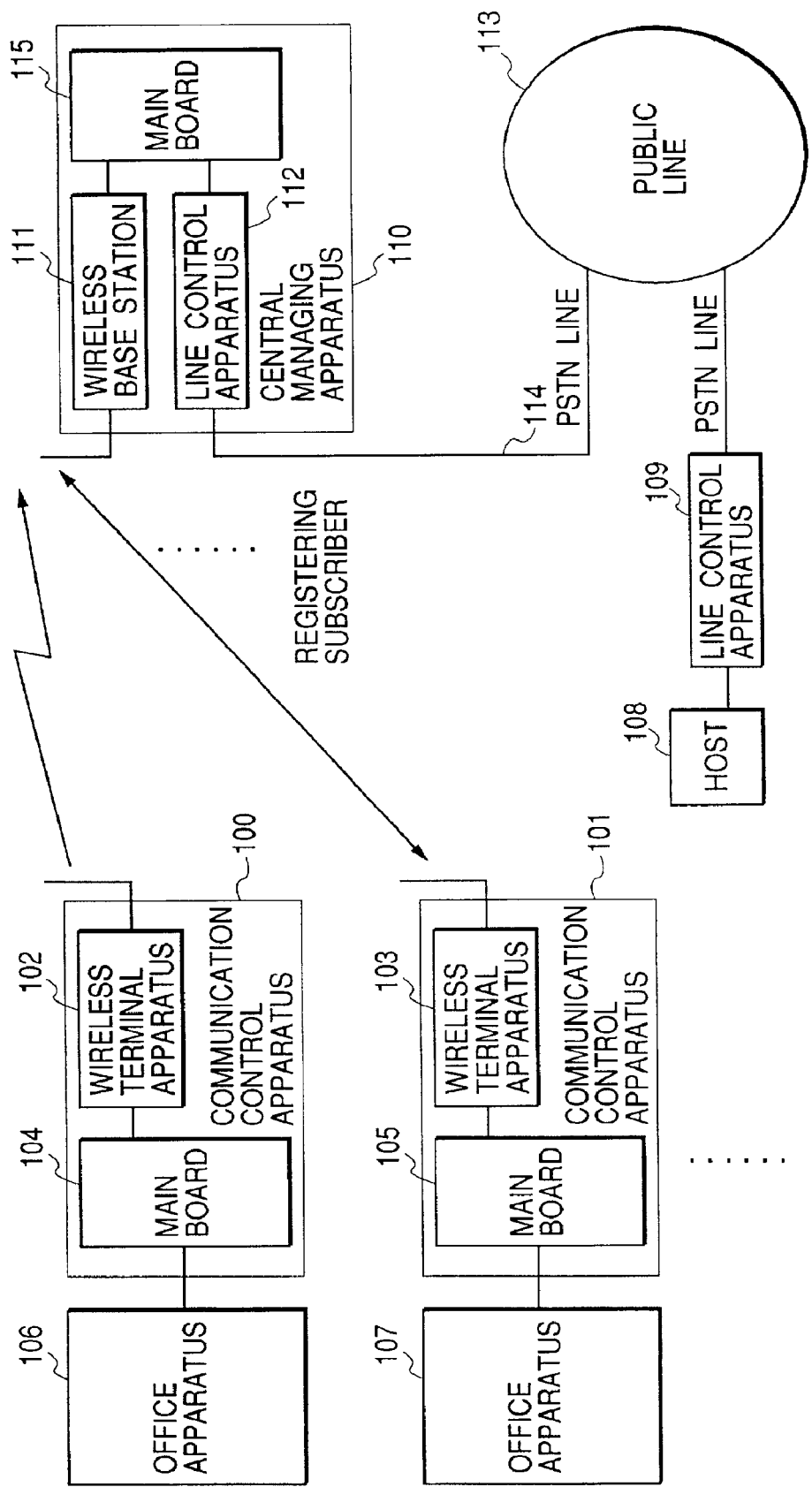
FIG. 1 is a schematic block diagram for indicating an entire arrangement of a wireless communication system according to a first embodiment of the present invention.

In FIG. 1, there is shown an overall arrangement of a wireless communication system according to this first preferred embodiment of the present invention.

In this drawing, reference numerals 100 and 101 show communication control apparatuses which are connected to office-use appliances 106 and 107 such as a copying machine, and a printer, respectively. It should be understood that these communication control apparatus 100 and 101 may be connected to home-use appliances (for example, air conditioner and video recording/reproducing appliance) other than the above-explained office-use appliances.

Also, reference numerals 102 and 103 indicate wireless terminal apparatuses which are communicated via a wireless base station 111 to each other.

Reference numerals 104 and 105 represent main boards which are connected to the office-use appliances 106 and 107, respectively. The main boards 104/105 instruct communications by the wireless terminal apparatus 102/103 in response to instructions issued from the office-use appliances 106/107, and also instruct both the office-use appliances 106/107 to output data while the wireless terminal apparatus 102/103 are communicated to each other. It should also be noted that the main boards 104/105 may be connected to a home-use appliance other than the office-use appliances 106/107. Alternatively, both the main board 104 and the main board 105 may instruct both the wireless terminal apparatus 100 and 101 to communicate with each other irrespective of instructions issued from the office-use appliances 106 and 107.

Also, reference numeral 108 represents a host located at a remote place, namely corresponds to a computer capable of remote-controlling the wireless control apparatuses 100 and 101. The host 108 performs a data communication with the office-use appliances 106 and 107 (or, home-use appliances which are not shown) via a public line 113, a central managing apparatus 110, and the communication control apparatus 100 and 101 so as to manage and control the office-use appliances 106/107, or the home-use appliances (not shown), namely so as to manage operation conditions thereof, so as to sense abnormal statuses thereof, and so as to set modes thereof.

Also, reference numeral 109 shows a line control apparatus for connecting the host 108 to a public line 119.

Reference numeral 110 indicates a central managing apparatus which is connected via both a PSTN line 114 and another public line 113 to the host 108. Also, the central managing apparatus 110 controls data such as maintenance data as to the office-use appliances 106/107 in a centrally managing manner, which are sent from the wireless control apparatuses 100 and 101. Reference numeral 111 represents a wireless base station, and reference numeral 112 indicates a line control apparatus used to connect the central managing apparatus 110 to the public line 113.

It should also be noted that the central managing apparatus 110 may be connected to a public line by way of not only the PSTN line 114, but also an ISDN line, or a public wireless line. Furthermore, the public line 113 may be connected to the host 108 by way of not only the PSTN line, but also an ISDN line, or a public wireless line.

Figure 2:
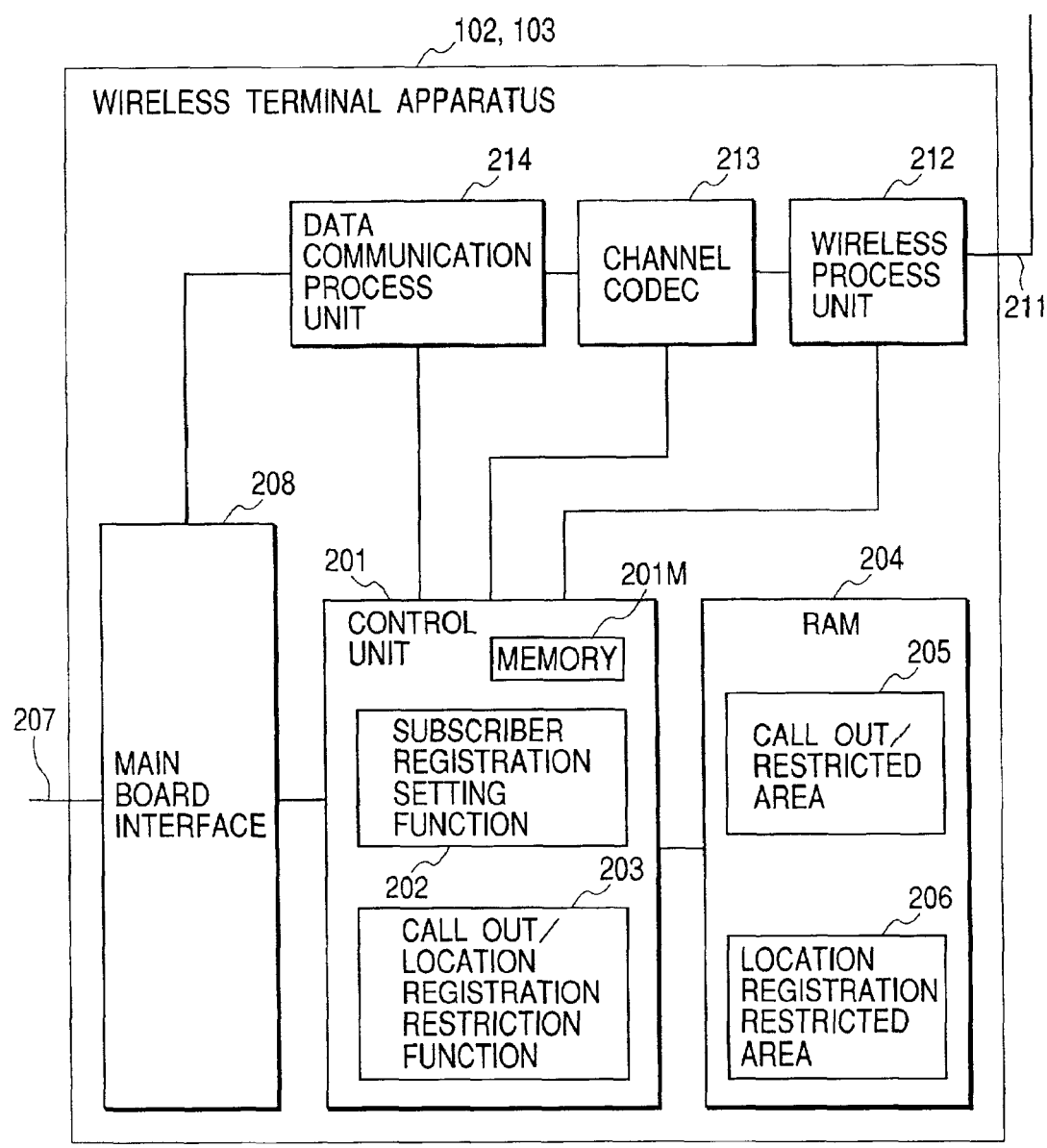
FIG. 2 is a schematic block diagram for showing an internal arrangement of a wireless terminal apparatus employed in the wireless communication system of the first embodiment.

FIG. 2 is a schematic block diagram for representing an internal arrangement of the above-explained wireless terminal apparatus 102, or 103 employed in the wireless communication system of this first embodiment.

Reference numeral 201 shows a control unit of a wireless communication unit. This control unit 201 contains a subscriber registration setting function 202 and a location registration restriction function 203. The subscriber registration setting function 202 is operated as follows. That is, when a power supply is turned ON and no subscriber registration operation is performed in any of the wireless base stations, the control unit 201 is automatically set to a subscriber registration setting mode and executes a subscriber registration process operation. The location registration restriction function 203 is operated as follows. That is, when a call out/location registration restriction notification signal is detected under such a condition that a subscriber registration operation has been completed with respect to a wireless base station, this location registration restriction function 203 restricts a transmission process operation such as a call out process operation and a location registration process operation.

The control unit 201 is arranged by a computer which is operated in accordance with a computer program. A memory 201M stores therein this program. In such an operation mode that this program is supplied from either a floppy disk (not shown) or a compact disk (not shown) to the control unit 201, this floppy disk, or compact disk corresponds to such a storage medium for storing therein this program readable by the control unit 201. Alternatively, this program may be supplied from an external program supply source (not shown) via an antenna 211 to this control unit 201.

Also, reference numeral 204 indicates a RAM (random access memory). This RAM 204 contains a call out restricted area 205, and a location registration restricted area 206. The call out restricted area 205 is an area for managing as to whether or not a call out restriction is being carried out based upon a call out/location registration notification signal issued from a wireless base station. The location registration restricted area 206 is an area for managing as to whether or not the location registration restriction is being carried out based upon a call out/location registration restriction notification signal issued from a wireless base station.

Also, reference numeral 207 shows a connection unit used for connecting to the main board 104 and the main board 105.

Also, reference numeral 208 indicates a main board interface for interfacing a transmission/reception of a signal between the main boards 104 and 105. Reference numeral 211 shows an antenna, reference numeral 212 denotes a wireless process unit for executing various sorts of process operations in order to transmit/receive a signal from/to the antenna 212 in a wireless manner. Also, reference numeral 213 indicates a channel code for encoding/decoding a signal. Reference numeral 214 shows a data communication process unit for executing various sorts of process operations as to a signal communicated with the main boards.

Figure 3:
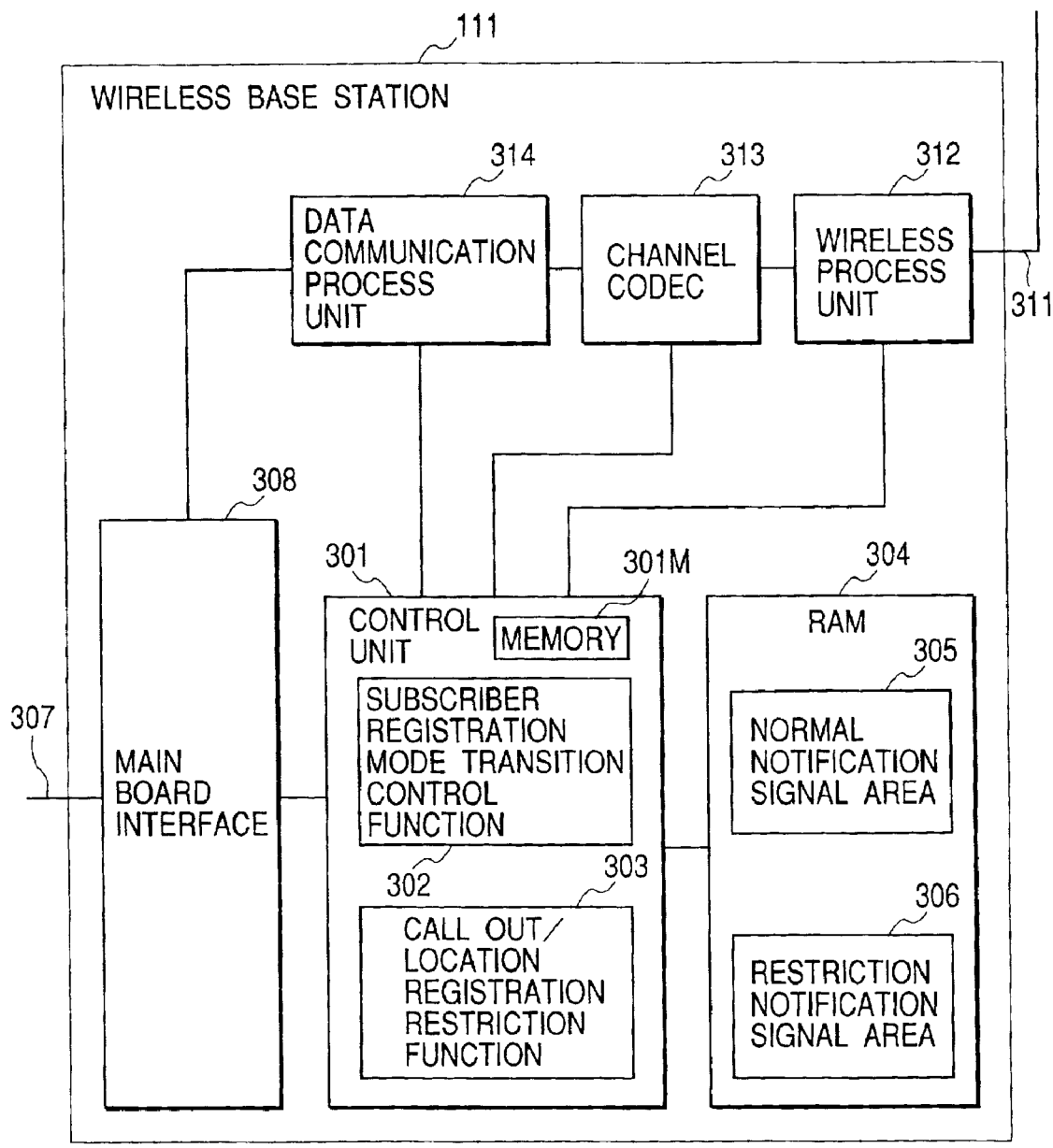
FIG. 3 is a schematic block diagram for indicating an internal arrangement of a wireless base station employed in the wireless communication system of the first embodiment.

FIG. 3 is a schematic block diagram for indicating an internal arrangement of the above-described wireless base station 111 employed in the wireless communication system of this first embodiment.

Reference numeral 301 shows a control unit. This control unit 301 contains a subscriber registration mode transition control function 302, and a call out/location registration restriction control function 303. The subscriber registration mode transition control function 302 corresponds to such a function that the operation of the wireless base station 111 is shifted to a subscriber registration mode in response to a request issued from the host 108 so as to execute a subscriber registration process operation of a wireless terminal apparatus. The call out/location registration restriction control function 303 may cause a wireless terminal apparatus to execute such transmission restrictions as a call out restriction and a location registration restriction. This wireless terminal apparatus has already been registered when the subscriber registration process operation is carried out.

The control unit 301 is arranged by a computer which is operated in accordance with a computer program. A memory 301M stores therein this program. In such an operation mode that this program is supplied from either a floppy disk (not shown) or a compact disk (not shown) to the control unit 301, this floppy disk, or compact disk corresponds to such a storage medium for storing therein this program readable by the control unit 301. Alternatively, this program may be supplied from an external program supply source (not shown) via an antenna 311 to this control unit 301.

Also, reference numeral 304 indicates a RAM which contains a communication notification signal area 305, and a restriction notification signal area 306. The communication notification signal area 305 is used to manage the normal condition, namely such a condition that a subscriber registration process operation is not being carried out. The restriction notification signal area 306 is to manage such a condition that a transmission restriction such as a call out restriction and a location registration restriction is being carried out with respect to a wireless terminal apparatus.

Also, reference numeral 307 shows a connection unit between the wireless base station 111 and the main board 115. Reference numeral 308 indicates a main board interface for interfacing a transmission/reception of a signal between the main boards 104 and 105. Reference numeral 311 shows an antenna, reference numeral 312 denotes a wireless process unit for executing various sorts of process operations in order to transmit/receive a signal from/to the antenna 311 in a wireless manner. Also, reference numeral 313 indicates a channel code for encoding/decoding a signal. Reference numeral 314 shows a data communication process unit for executing various sorts of process operations as to a signal communicated with respect to the main board 115.

FIG. 4A to FIG. 4C show format diagrams of a notification signal which is transmitted by the wireless base station 111 (and received by wireless terminal apparatus) in this first embodiment.

In this drawing, reference numeral 400 shows a system information notification message. The system information notification message 400 contains wireless base station (CS) information 410 and wireless channel restriction information 420.

The wireless base station (CS) information 410 contains a bit 401 for notifying as to whether or not the wireless base station (CS) 111 is a station into which subscriber data is written (namely, this bit indicates as to whether or not this wireless base station 111 corresponds to such a wireless base station of subscriber registration mode). When the bit 401 is equal to "1", the wireless base station (CS) 111 corresponds to such a subscriber data writing base station. When the bit 401 is equal to "0", the wireless base station (CS) 111 is not a subscriber data writing base station.

Also, the wireless channel restriction information 420 contains a bit 402, and another bit 403. The bit 402 notifies as to whether or not a location registration restriction is established with respect to a wireless terminal (PS) whose subscriber registration has already been registered. The bit 403 notifies as to whether or not a call out restriction is established with respect to a wireless terminal (PS).

When the bit 402 is equal to "1", this bit 402 notifies that the location registration restriction is established with respect to the wireless terminal (PS) whose subscriber registration has already been established. When the bit 402 is equal to "0", this bit 403 notifies that the location registration restriction is not established with respect to the wireless terminal (PS) whose subscriber registration has already been established.

Also, when the bit 403 is equal to "1", this bit 403 notifies that the call out restriction is established with respect to the wireless terminal (PS). When the bit 403 is equal to "0", this bit 403 notifies that the call out restriction is not established.

As represented in FIG. 4A to FIG. 4C, the system information notification message 400 is made of 8 pieces of octets. Among these octets, a first bit to a sixth bit of a third octet correspond to the wireless base station (CS) information 410, and a fifth bit to an eighth bit of a sixth octet correspond to the wireless channel restriction information 420. Also, a fourth bit of the third octet corresponds to the above-explained bit 401. A sixth bit and a fifth bit of the sixth octet correspond to the above-explained bits 402 and 403, respectively.

FIG. 5 is a sequence diagram for representing such a case that the wireless terminal apparatus 103 operating in the subscriber registration mode executes the subscriber registration process operation with respect to the wireless base station 111 in the subscriber registration mode, whereas the wireless terminal apparatus 102 whose subscriber registration operation has already been completed and which is operating under normal condition executes the call out restriction process operation when a call out request is received from the main board 104.

As is represented in FIG. 5, in this first embodiment, in a registration mode for registering a wireless terminal apparatus whose subscriber registration operation has not yet been completed (103 in FIG. 5), a signal transmission from such a wireless terminal apparatus (103 in FIG. 5) whose subscriber registration operation has already been completed is restricted (103 in FIG. 5).

In other words, the wireless base station 111 transmits a restriction notification signal in response to a subscriber registration mode transition request issued from the host 108. When the restriction notification signal is received, the wireless terminal apparatus 102 whose subscriber registration operation has already been made is brought into a restriction mode. In the restriction mode, the wireless terminal apparatus 102 returns a disconnect display with respect to a call out request issued from the main board 104. Upon receipt of the restriction notification signal, the wireless terminal apparatus 103 whose subscriber registration operation has not yet been registered performs a subscriber registration sequence with respect to the wireless base station 111. When the subscriber registration of the wireless terminal apparatus 103 can succeed, the subscriber registration mode is released, and then, the notification signal in the normal mode is transmitted.

It should be understood that the wireless terminal apparatus 102 and 103, and the wireless base station 111 are operated as follows, since the control unit 201 and the control unit 301 execute the programs which are stored in the memory 201M and the memory 301M.

Figure 6A:
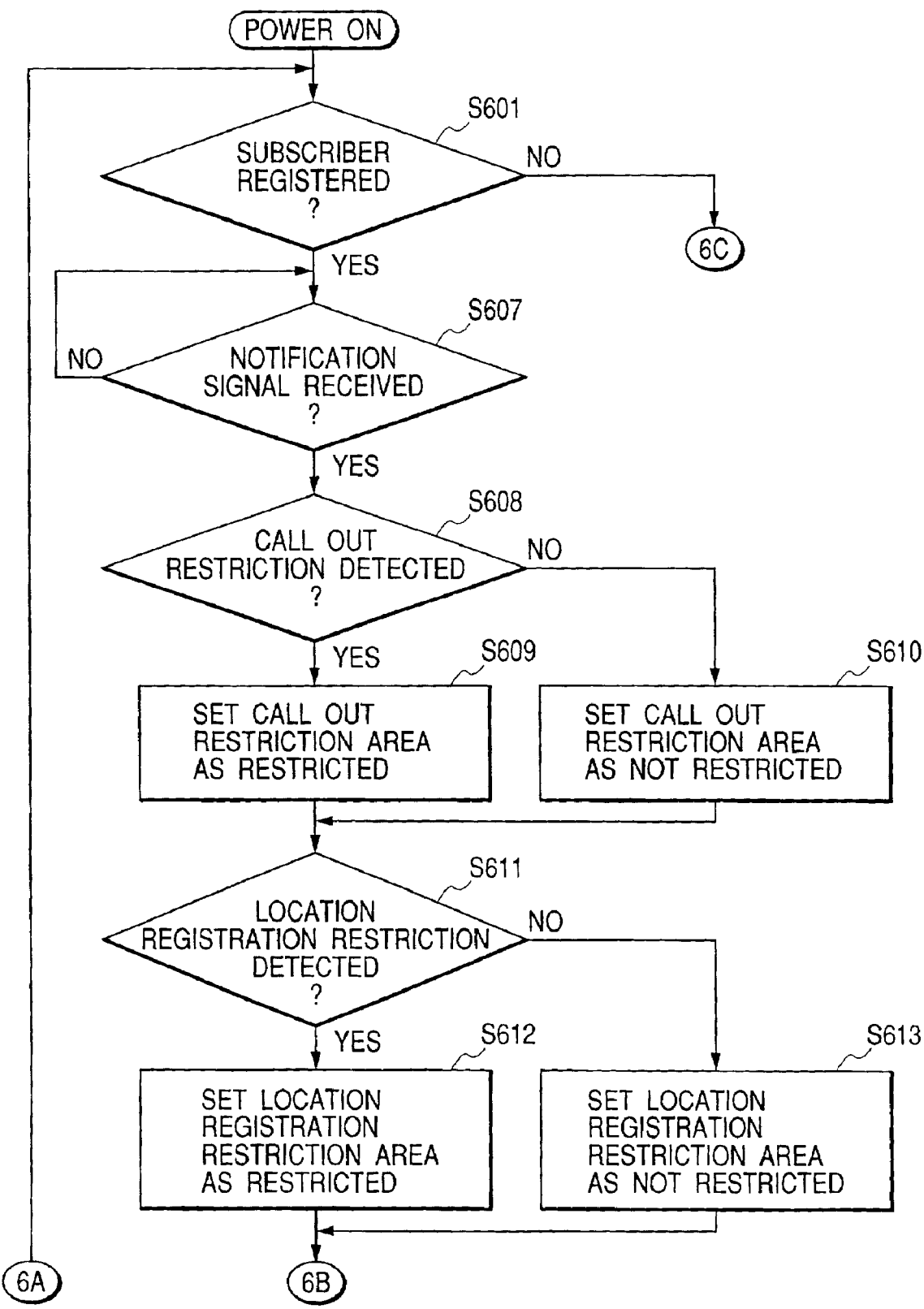
FIGS. 6A, 6B and 6C are flow charts for describing operations of the wireless terminal apparatus employed in the wireless communication system of the first embodiment.
Figure 6B:
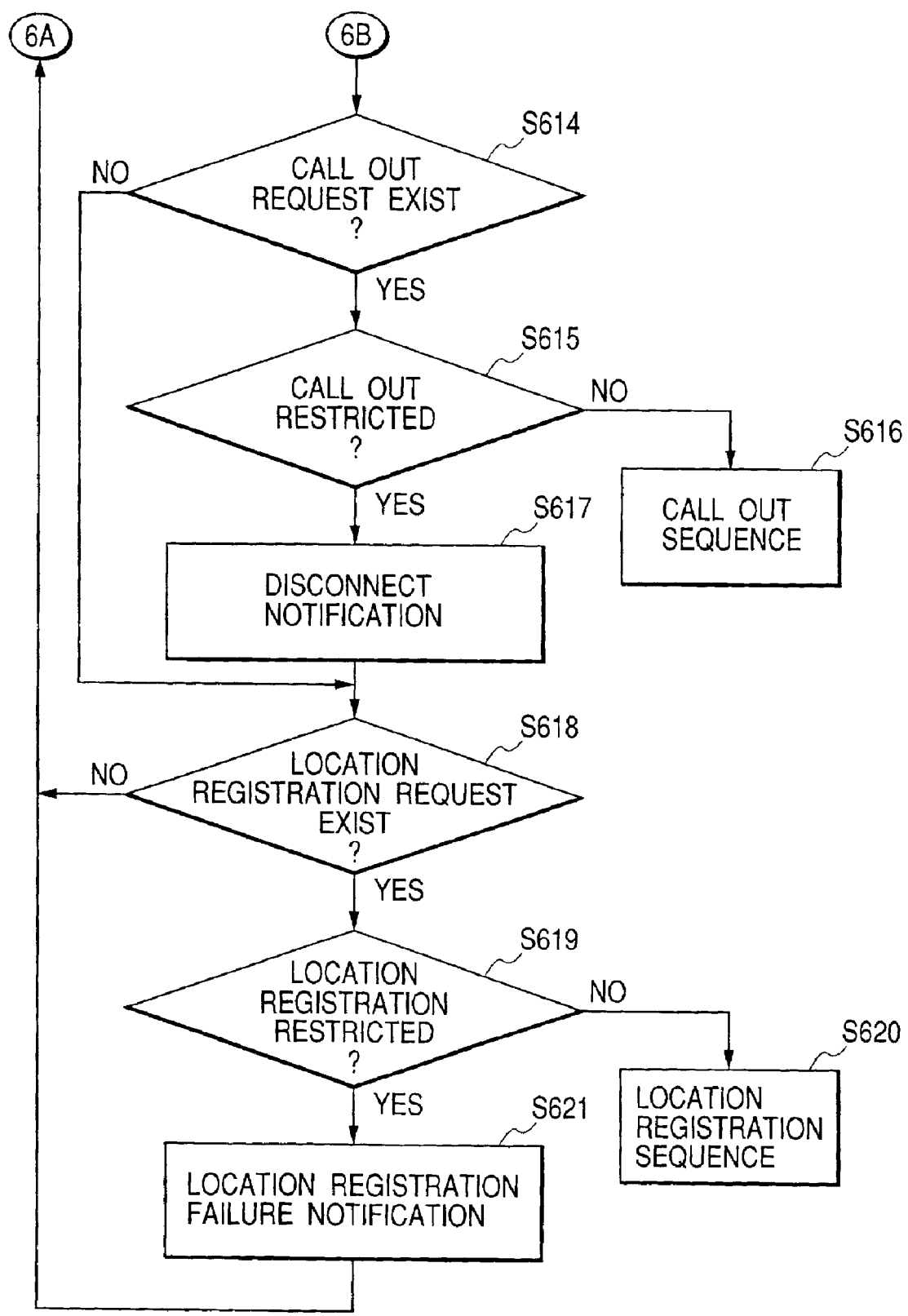
Figure 6C:
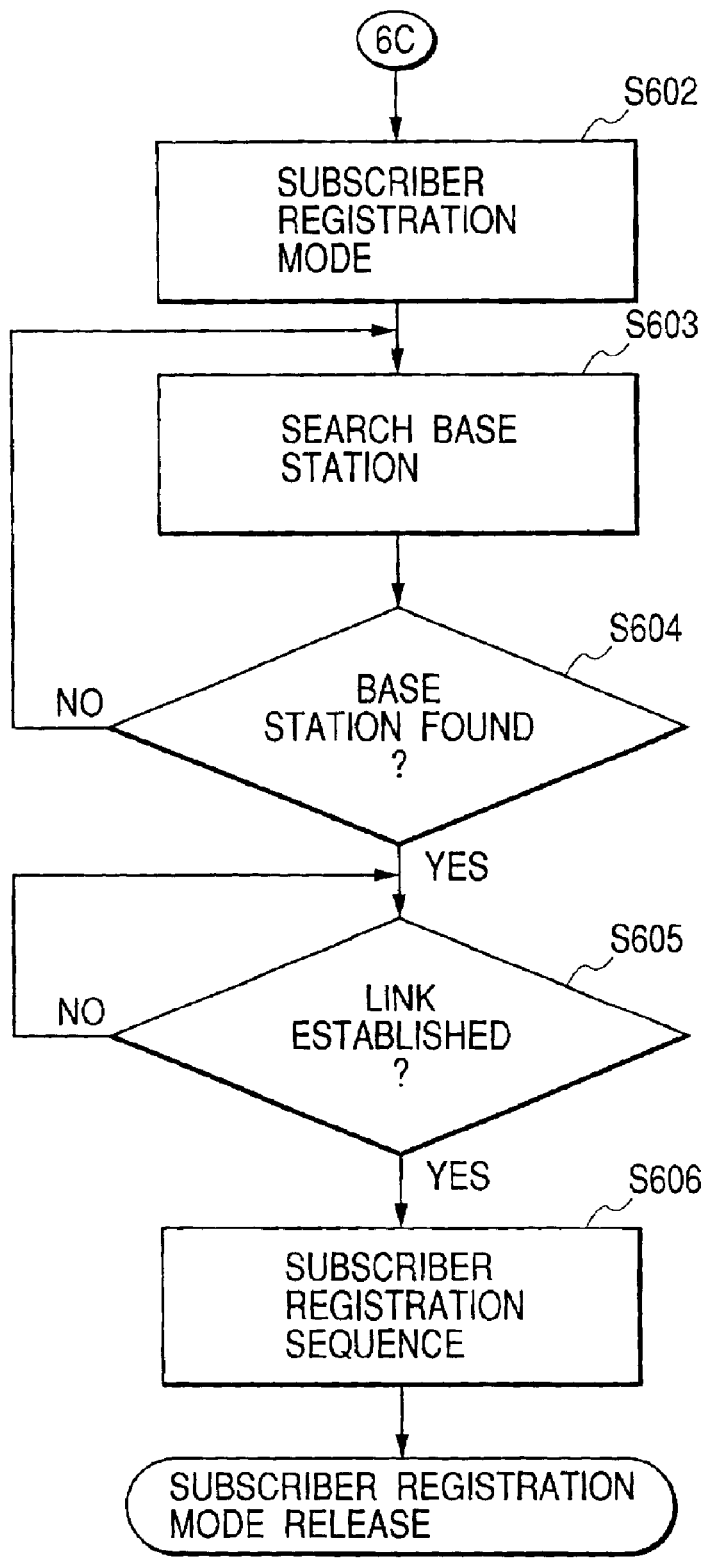

FIG. 6A to FIG. 6C are flow charts for explaining operations of the control unit 201 employed in the wireless terminal apparatus 102 and 103. This flow chart indicates a portion of a computer program which is stored in the memory 201M and is readable by the control unit 201.

First, a subscriber registration mode transition request is issued from the host 108 with respect to the wireless base station 111 (step S500). In other words, first, in order to be connected to the line control apparatus 112, the host 108 issues a request via the line control apparatus 109 to the public line 113. Thereafter, the host 108 sends the subscriber registration mode transition request via the main board 115 to the wireless base station 111 under such a condition that this host 108 is connected to the line control apparatus 112.

The wireless base station 111 sets such a fact that the present mode is the subscriber registration mode into the restriction notification signal area 306 of the RAM 304, and the operation mode of this wireless base station 111 is transferred from the normal (step S502). Then, the wireless base station 111 commences a transmission of a notification signal of the subscriber registration mode by which both the call out restriction and the position registration restriction are instructed (step S503). In other words, the wireless base station 111 transmits such a system information notification message 400 in which the bit 401 of FIG. 4B is set to "1", the bit 402 is set to "1", and the bit 403 is set to "1". In this case, the bit 401 of "1" (shown in FIG. 4B) indicates that this notification signal is equal to the notification signal of the subscriber registration mode.

Since the subscriber registration of the wireless terminal apparatus 102 has already been accomplished (step S601) and this wireless terminal apparatus 102 is operated under the normal mode, in the case that the wireless terminal apparatus 102 receives both a notification signal of a call out restriction and a notification signal of a location registration restriction (step S607), which are sent from such a wireless base station where the terminal apparatus performs a waiting operation, this wireless terminal apparatus 102 reads a wireless channel restriction information 420 of this notification signal, and then, judges as to whether or not a call out restriction is being established based upon a bit 403 thereof (step S608).

In this case that the call out restriction is being established, the wireless terminal apparatus 102 sets such a fact that the call out restriction is being established into the call out restricted area 205 of the RAM 204 (step S609), and then, is brought into the call out restriction state (step S511). In the case that the call out restriction is not being established, the wireless terminal apparatus 102 sets such a fact that the call out restriction is not being established into the call out restricted area 205 (step S610).

Also, the wireless terminal apparatus 102 judges as to whether or not a location registration restriction is being established based upon the bit 402 of the wireless channel restriction information 420 of the received notification signal (step S611). In the case that the location registration restriction is being established, the wireless terminal apparatus 102 sets such a fact that the location registration restriction being established into the location registration restricted area 206 of the RAM 204 (step S612), and then, is brought into the location registration restriction state (step S511). To the contrary, when the location registration restriction is not being established, the wireless terminal apparatus 102 sets such a fact that the location registration restriction is not being established into the location registration restricted area 206 (step S613).

When the wireless terminal apparatus 102 is entered into the mode of call out/location registration restrictions, even if a call out request is issued from the main board 104 (step S512), this wireless terminal apparatus 102 immediately sends a disconnect display to the main board 104 (step S513) so as to restrict the call out.

In other words, when the call out request is issued from the main board 104 (step S614), the wireless terminal apparatus 102 checks as to whether or not the setting condition of the call out restricted area 205 is under call out restriction (step S615). When the setting condition is under call out restriction, the wireless terminal apparatus 102 performs a disconnect process operation by which the disconnect display is transmitted to the main board 104 (step S617). It should be noted that when the setting condition is not under call out restriction, the wireless terminal apparatus 102 executes the call out sequence in answer to the request of the main board 104 (step S616).

Also, in such a case that a location registration request is issued from either the main board 104 or the wireless process unit 212 (step S618), the wireless terminal apparatus 102 checks as to whether or not the setting condition of the location restricted area 206 is under location restriction (step S619). When the setting condition is under location registration restriction, the wireless terminal apparatus 102 notifies a failure of such a location registration operation to either the main board 104 or the wireless process unit 212, which requests the location registration (step S621). It should be noted that when the setting condition is not under location registration restriction, the wireless terminal apparatus 102 executes the location registration sequence with respect to the wireless base station (step S620).

On the other hand, when the wireless terminal apparatus 103 judges that the subscriber registration has not yet been completed while the power supply is turned ON (step S601), the operation mode of this wireless terminal apparatus 103 is automatically brought into the subscriber registration mode (step S602), and also the wireless terminal apparatus 103 immediately executes to retrieve such a wireless base station operated in the subscriber registration mode (steps S501 and S603).

Then, when the wireless terminal apparatus 103 finds out such a wireless base station 111 which transmits the notification signal (step S503) of the subscriber registration mode (steps S504 and S604), channel establishment request to this wireless base station 111 (step S505). When a link channel allocation is received from the wireless base station 111 (step S506), this wireless terminal apparatus 103 establishes a link between the wireless terminal apparatus 103 and the wireless base station 111 (step S605), and then, executes the subscriber registration sequence between the wireless terminal apparatus 103 and the wireless base station (steps S507 and S606).

It should also be noted that when the bit 401 of FIG. 4B is equal to "1", the wireless terminal apparatus 103 may recognize that the relevant signal corresponds to the notification signal of the subscriber registration mode.

In another embodiment of the present invention, while the wireless terminal apparatus 103 does not judge as to whether or not a notification signal corresponds to the subscriber registration mode, this wireless terminal apparatus 103 executes a subscriber registration sequence in connection with such a base station which transmits another notification signal when this notification signal is received in the subscriber registration mode. In this embodiment, the bit 401 of FIG. 4B may be equal to "1", or "0".

Also, in the wireless terminal apparatus 103 whose subscriber registration operation has not yet been completed, such a fact that the location registration restriction is being established is not set into the call out restricted area 205 of the RAM 204. Also, even when the location registration restriction notification signal is r7eceived (step S503), this wireless terminal apparatus 103 does not receive the restriction of the subscriber registration. In other words, the restriction established by the notification signal transmitted at the step S503 is made as to the location registration, and thus, the subscriber registration is not restricted.

When the subscriber registration of the wireless terminal apparatus 103 can succeed, the wireless base station 111 releases the subscriber registration mode (step S509). In other words, the wireless base station 111 releases setting of the restriction notification signal area 306 of the RAM 304, and then set such a fact that the present mode is the normal mode into a normal notification signal area.

On the other hand, when the subscriber registration of the wireless terminal apparatus 103 is accomplished, the wireless base station 111 notifies the success of this subscriber registration (step S508). In a modification of the present invention, the wireless base station 111 notifies such identification information capable of identifying the wireless terminal apparatus 103 to the host 108.

Thereafter, the host 108 instructs the base station 111 to disconnect the PSTN line 114, so that the connection established between the line control apparatus 109 and the public line 113 is disconnected.

When the subscriber registration of the wireless terminal apparatus 103 can succeed, the wireless base station 111 releases the subscriber registration mode (step S509). In other works, the wireless base station 111 releases setting of the restriction notification signal area 306 of the RAM 304, and then set such a fact that the present mode is the normal mode into a normal notification signal area.

Then, the wireless base station 111 transmits such a notification signal of the normal mode, in which the restrictions of transmitting the call out restriction and the location registration restriction are released (step S510). In other words, the wireless base station 111 transmits such a system information notification message 400 in which the bit 401 of FIG. 4B is set to "0", the bit 402 of FIG. 4C is set to "0", and the bit 403 of FIG. 4C is set to "0".

The wireless terminal apparatus 103 which receives the notification signal of the normal mode releases the call out/location registration restrictions (steps S514, S610, S613), and may accept a call out request and a location registration request, which are issued from the main board 104.

In another embodiment mode of the present invention, the releasing operation (step S509) of the subscriber registration mode of the wireless base station 111 is carried out in response to an instruction made from the host 108.

For instance, in the case that the registration operations of three sets of wireless terminal apparatus are carried out by the host 108, when the host 108 receives such a notification (step S508) that the subscriber registrations can succeed three times, this host 108 releases the subscriber registration mode of the wireless base station 111 (step S509).

After the registration of the first set of the wireless terminal apparatus 103 could succeed, this wireless terminal apparatus 103 releases the subscriber registration mode, and then sets the normal mode. On the other hand, while the operation of the wireless base station 111 is kept under the subscriber registration mode, this wireless base station 111 transmits a call out/location registration restriction notification signal. As a result, the wireless terminal apparatus 103 set under the normal mode receives this call out/location registration restriction notification signal, and the operation of this wireless terminal apparatus 103 is brought into the call out/location registration restriction mode similar to the wireless terminal apparatus 102. In the case that the registration operations of the second/third wireless terminal apparatus can succeed, the host 108 releases the subscriber registration mode of the wireless base station 111, whereas this wireless base station 111 transmits a call out/location registration restriction release notification signal. Then, the wireless terminal apparatus 102 and 103 receive this call out/location registration restriction release notification signal, and then, release the call out/location registration restriction mode.

In accordance with this first embodiment, in the case that the operation mode of the wireless base station is brought into the subscriber registration mode, this wireless base station performs the calling control such as the call out restriction and the position registration restriction with respect to the wireless terminal apparatus, and therefore, this wireless base station can control that this wireless terminal apparatus does not transmit the wireless signal. As a result, while the useless traffics of the control channel can be avoided, this wireless communication system can contribute the effective utilization of the control channels.

Also, in accordance with the modification of the present invention, the wireless base station 111 executes both the call out restriction and the location registration restriction of the wireless terminal apparatus 102 whose subscriber registration operation has been accomplished in the subscriber registration mode. However, the wireless base station 111 may carry out only one of the call out restriction and the location registration restriction of the wireless terminal apparatus 102. For instance, the wireless base station 111 restricts the call out of the wireless terminal apparatus 102 whose subscriber registration operation has been completed, but does not restrict the location registration thereof.

Next, the following embodiment will now be explained. That is, in the case that either a call out request or a location registration request is issued to such a wireless terminal apparatus in which call out/location registration restrictions are carried out, the wireless terminal apparatus holds, or reserves this call out request, or this location registration request. When the restrictions of the call out/location registration is released, the wireless terminal apparatus executes the held call out operation and the held location registration operation.

It should also be understood that an entire arrangement of a wireless communication system, an internal arrangement of a wireless base station 111, and an internal arrangement of a wireless terminal apparatus 102, according to this embodiment, are similar to those disclosed in FIG. 1, FIG. 2, and FIG. 3, respectively.

FIG. 7 is a sequence diagram for representing operations of the wireless terminal apparatus 102 operated under normal condition in such a case that the wireless base station 111 is operated in the subscriber registration mode. It should be understood that since a process operation of the wireless terminal apparatus 103 for executing the subscriber registration process operation is similar to the above-explained process operation of FIG. 5, a description of this process operation is omitted in the below-mentioned description.

Figure 8A:
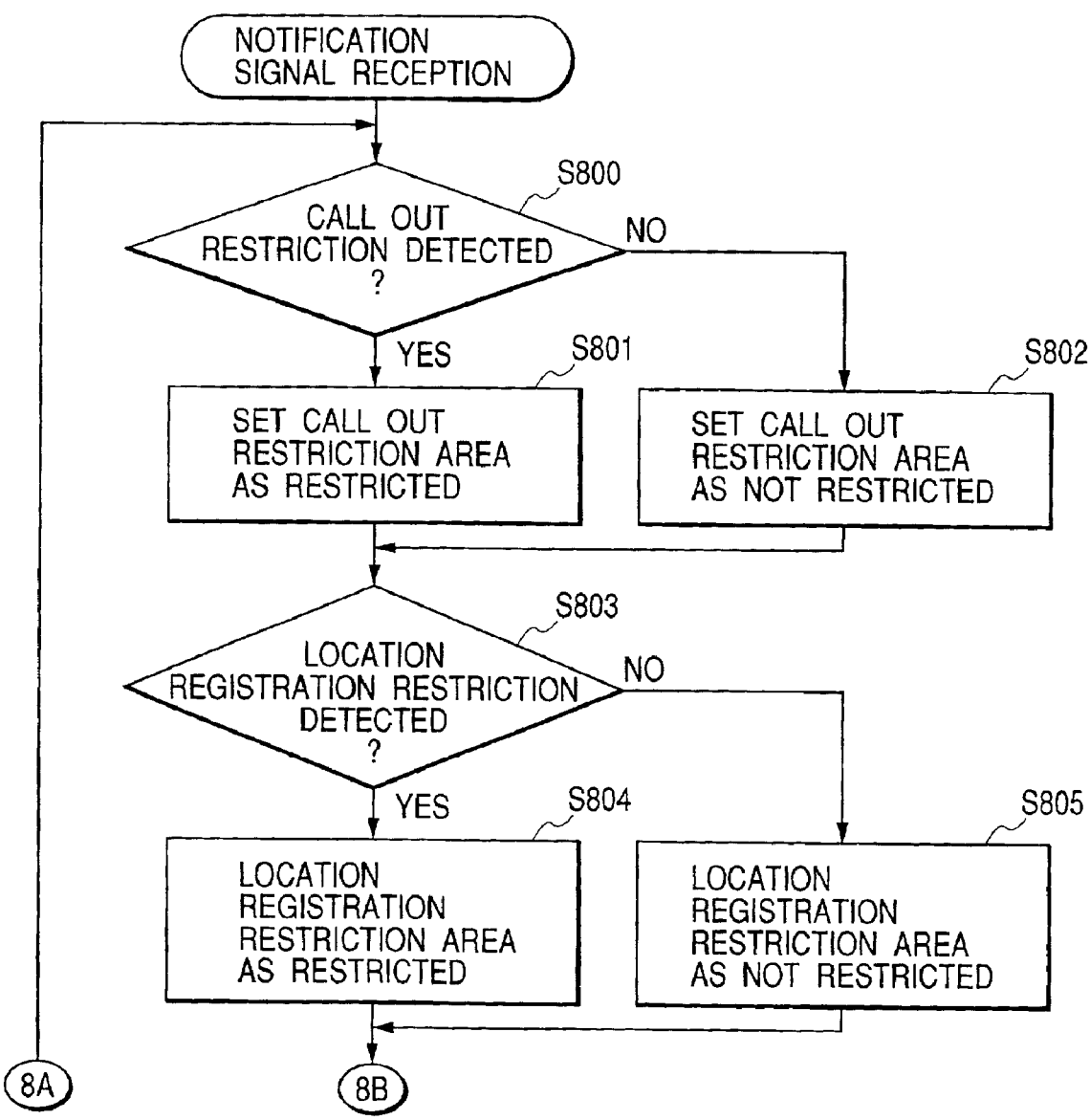
FIGS. 8A, 8B and 8C are flow charts for describing operations of the wireless terminal apparatus employed in the wireless communication system of the second embodiment.
Figure 8B:
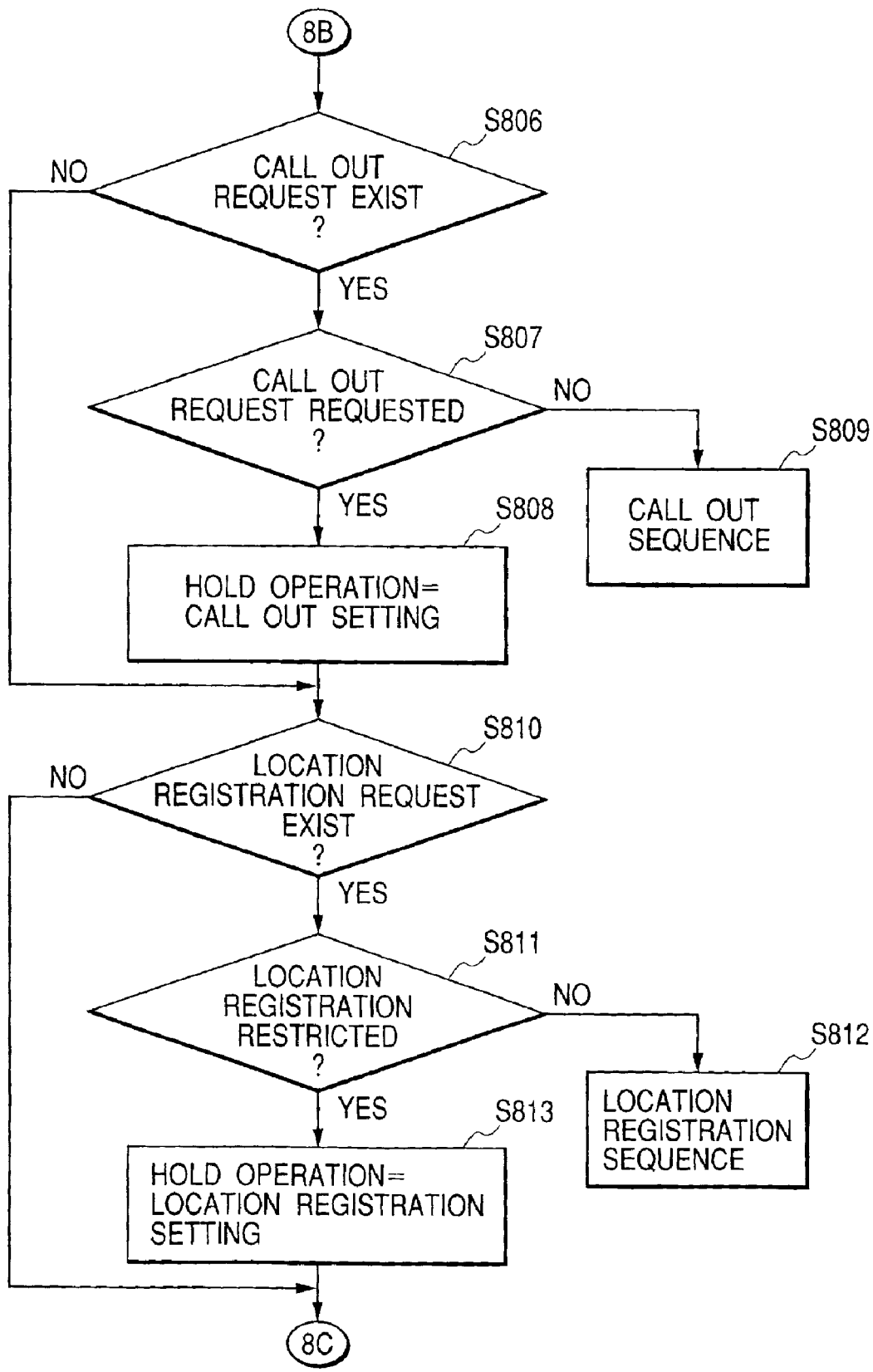
Figure 8C:
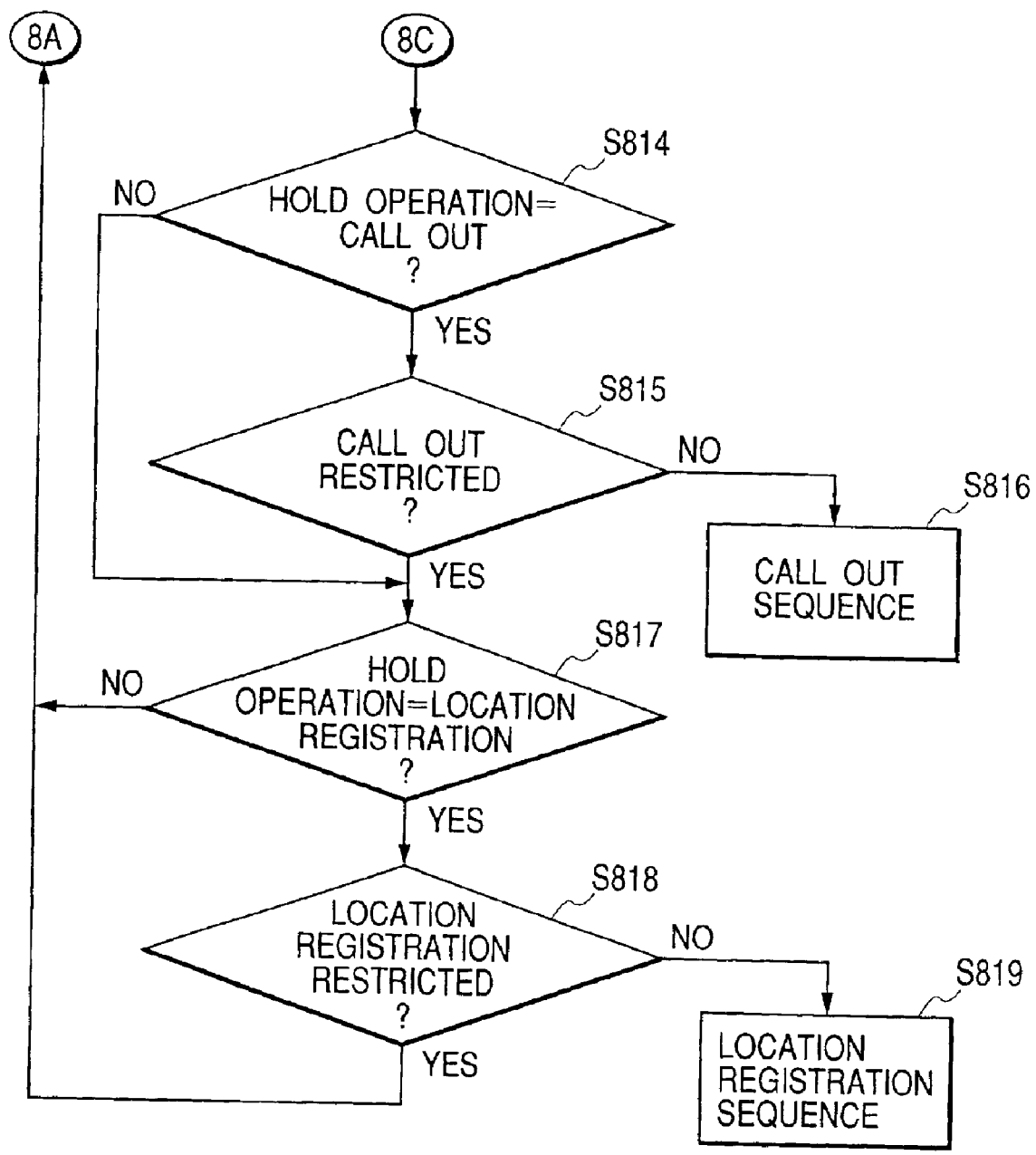

Also, FIG. 8A to FIG. 8C is an operation flow chart for describing operations of the control unit 201 employed in the wireless terminal apparatus 102. This flow chart indicates a portion of a program which is stored into the memory 201M, and is readable by the control unit 201. It should also be noted that both the wireless terminal apparatus 102 and 103, and also the wireless base station 111 are operated as follows, since the control unit 201 and the control unit 301 execute programs which are stored in the memory 201M and the memory 301M.

First, the host 108 issues a subscriber registration mode transition request to the wireless base station 111 (step S700).

The wireless base station 111 sets such a fact that the present operation mode (normal mode) corresponds to the subscriber registration mode into the restriction notification signal area 306 of the RAM 304, and then the present operation mode thereof is transferred from the normal operation mode to the subscriber registration mode (step S701). This wireless base station 111 starts to transmit a notification signal of this subscriber registration mode which may instruct both a call out restriction and a location registration restriction (step S702).

When the wireless terminal apparatus 102 receives the notification signal transmitted form the wireless base station 111 which is operated under waiting condition, the wireless terminal apparatus 102 reads out wireless channel restriction information of this notification signal and also judges as to whether or not the call out restriction is being established (step S800).

In the case that the call out restriction is being established, the wireless terminal apparatus 102 sets such a fact that the present condition is set under call-out restriction into the call out restricted area 205 of the RAM 204 (step S801), and then, is brought into the call out restriction state (step S703). In the case that the call out restriction is not being established, the wireless terminal apparatus 102 sets such a fact that the call out restriction is not being established into the call out restricted area 205 (step S802).

Also, the wireless terminal apparatus 102 judges as to whether or not a location registration restriction is being established based upon the wireless channel restriction information of the received notification signal (step S803). In the case that the location registration restriction is being established, the wireless terminal apparatus 102 sets such a fact that the location registration restriction being established into the location registration restricted area 206 of the RAM 204 (step S804), and then, is brought into the location registration restriction state (step S703). To the contrary, when the location registration restriction is not being established, the wireless terminal apparatus 102 sets such a fact that the location registration restriction is not being established into the location registration restricted area 206 (step S805).

When the wireless terminal apparatus 102 is entered into the mode of call out/location registration restrictions, even if a call out request is issued from the main board 104 (step S704), this wireless terminal apparatus 102 immediately holds the call out request so as to restrict the call out, while the wireless terminal apparatus 102 does not transmit wireless signals (step S705). In other words, when the call out request is issued from the main board 104 (step S806), the wireless terminal apparatus 102 checks as to whether or not the setting condition of the call out restricted area 205 is under call out restriction (step S807). When the setting condition is under call out restriction, the wireless terminal apparatus 102 sets this call out request as the holding operation (step S808).

To the contrary, when the setting condition is not under call out restriction, the wireless terminal apparatus 102 executes the call out sequence in answer to the request of the main board 104 with respect to the wireless base station (step S809).

Also, in such a case that a location registration request is issued from either the main board 104 or the wireless process unit 212 (step S810), the wireless terminal apparatus 102 checks as to whether or not the setting condition of the location registration restricted area 206 is under location registration restriction (step S811). When the setting condition is under location registration restriction, the wireless terminal apparatus 102 sets this location registration request as the hold operation (step S813). To the contrary, when the setting condition is not under location registration restriction, the wireless terminal apparatus 102 executes the location registration sequence (step S812).

Also, the wireless terminal apparatus 102 checks as to whether or not there is such an operation set to the hold operation (steps S814 and S817). When the hold operation of the call out is present, the wireless terminal apparatus 102 checks as to whether or not the call out restricting operation is released with reference to the call out restricted area 205 (step S815). When this call out restricting operation is released, this wireless terminal apparatus 102 executes the call out sequence (step S816). In this call out sequence defined at the step S816, when the wireless terminal apparatus 102 is connected to the call out destination, this wireless terminal apparatus 102 notifies the completion of this connection to the main board 104. Thereafter, the main board 104 performs such a communication operation which is predetermined when the call out request is previously held. It should also be noted that this call out request corresponds to a call out-request issued via the central managing apparatus 110 to the public line 113, or another call out request issued to the central managing apparatus 110 so as to transmit data to the central managing apparatus 110.

Also, when there is such a hold operation of a location registration, the wireless terminal apparatus 102 checks as to whether or not the location registration restriction is released with reference to the location registration restricted area 206 (step S818). When the location registration restriction is released, the wireless terminal apparatus 102 executes the location registration sequence (step S819).

Also, in the case that the above-described wireless base station 111 completes the subscriber registration operation with respect to such a wireless terminal apparatus (for example, wireless terminal apparatus 102) whose subscriber registration has not yet been accomplished, this wireless base station 111 releases the subscriber registration mode (step S706). Alternatively, it should be understood that the above-explained releasing operation of the subscriber registration mode defined at the step S706, and also the transmission of the notification signal for notifying the normal mode defined at the step S707 may be carried out in response to an instruction issued from the host 108.

As previously described, the wireless terminal 102 which receives the notification signal of the normal mode executes the releasing operation of the call out/location registration (steps S708, S802, and S805), and further, releases the hold operations of both the call out and the location registration (step S709). As a consequence, the wireless terminal apparatus performs the call out sequence (step S710) and the location registration sequence (steps S816 and S819) based upon the call out request and the location registration request, the hold operations of which are released.

As previously explained, in accordance with this second embodiment, in such a case that the wireless base station 111 is operated in the subscriber registration mode, this wireless base station 111 may apply such a restriction to the wireless terminal apparatus 102 whose subscriber registration has been completed in such a manner that this wireless terminal apparatus 102 holds to transmit the wireless signal. Also, when the wireless base station 111 releases the subscriber registration mode, since this wireless base station 111 commences the transmission process operation set under holding condition, the main board 104 need not control the timer and the like, but can execute other tasks thereof.

In the above-explained second embodiment, the wireless base station may restrict the call out process operation and the location registration process operation based upon the wireless channel restriction information of FIGS. 4A to 4C.

Next, such a third embodiment is explained as follows: That is, such a wireless terminal apparatus whose subscriber registration operation has been completed may execute a transmission control when a wireless base station receives a notification signal indicative of a subscriber registration mode.

Referring now to drawings, a wireless communication system according to a third embodiment of the present invention will be described. It should be understood that since both an entire system arrangement and an internal arrangement of a wireless base station 111, employed in this third embodiment, are similar to those of FIG. 1 and FIG. 3, explanations thereof are omitted.

Figure 9:
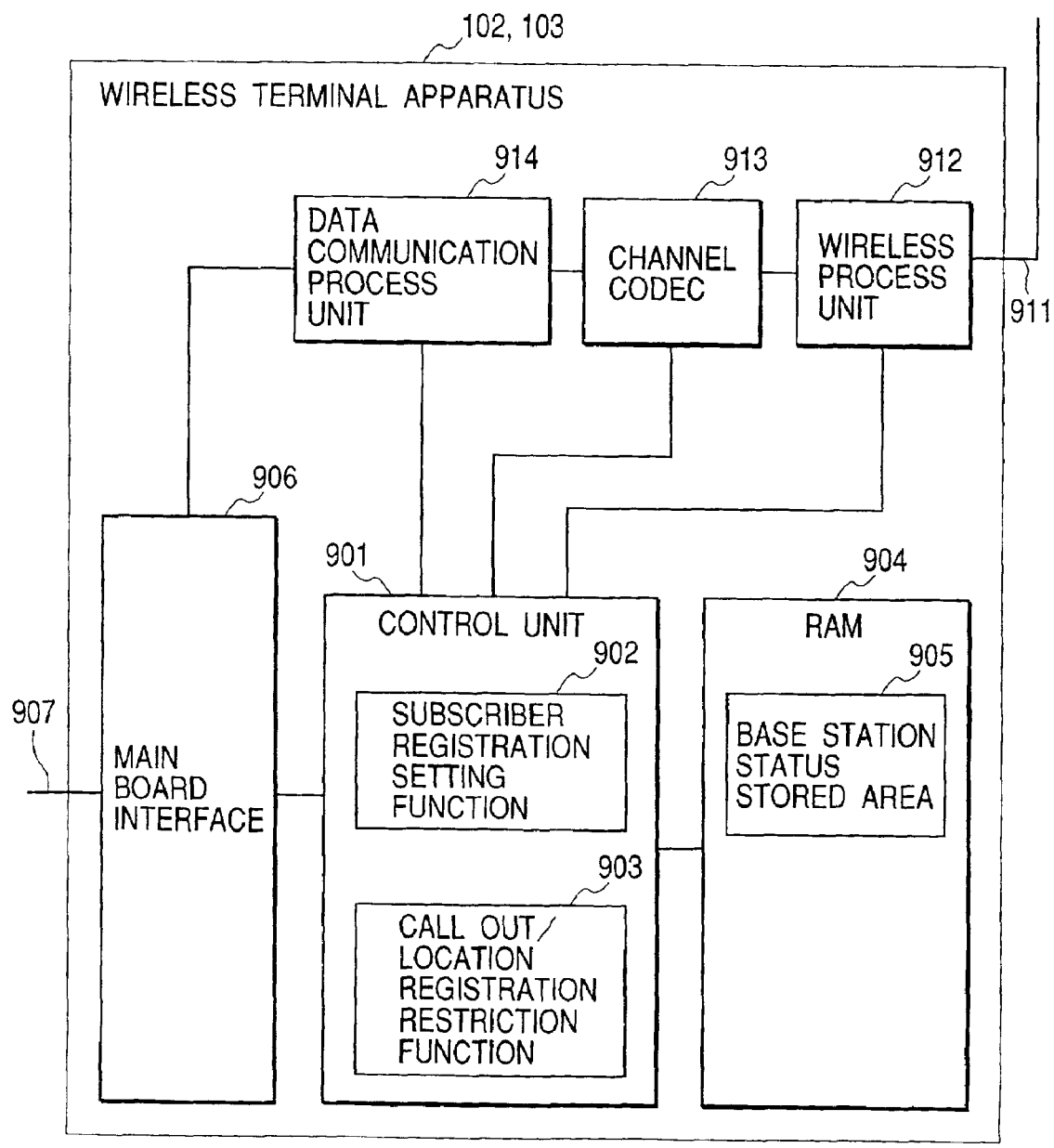
FIG. 9 is a schematic block diagram for indicating an internal arrangement of a wireless terminal apparatus according to another embodiment of the present invention.

FIG. 9 is a schematic block diagram for representing an internal arrangement of a wireless terminal apparatus 102, or 103 employed in the wireless communication system of this third embodiment.

Reference numeral 901 shows a control unit of a wireless communication unit. This control unit 901 contains a subscriber registration setting function 902 and a cell out location registration restriction function 903. The subscriber registration setting function 902 is operated as follows. That is, when a power supply is turned ON and no subscriber registration operation is performed in any of the wireless base stations, the control unit 901 is automatically set to a subscriber registration setting mode and executes a subscriber registration process operation. The cell out location registration restriction function 903 is operated as follows. That is, in the case that a notification signal indicative of a subscriber registration mode is detected and this notification signal is transmitted from such a wireless base station to which this wireless terminal apparatus has been registered under such a condition that the subscriber registration to the wireless base station has been completed, this call out/location registration restriction function 903 restricts such a transmission process operation as a call out process operation and also a location registration process operation.

The control unit 901 is arranged by a computer which is operated in accordance with a computer program. A memory 901M stores therein this program. In such an operation mode that this program is supplied from either a floppy disk (not shown) or a compact disk (not shown) to the control unit 901, this floppy disk, or compact disk corresponds to such a storage medium for storing therein this program readable by the control unit 901. Alternatively, this program may be supplied from an external program supply source (not shown) via an antenna 911 to this control unit 901.

Also, reference numeral 904 indicates a RAM (random access memory). This RAM 904 contains a base station status stored area 905. This base station status stored area 905 is used to manage as to whether or not a wireless base station to which this wireless terminal apparatus has been registered is set under the subscriber registration mode.

Also, reference numeral 907 shows a connection unit used to connect a main board 104 to a main board 105. Also, reference numeral 906 indicates a main board interface for interfacing a transmission/reception of a signal between the main boards 104 and 105.

Reference numeral 911 shows an antenna, reference numeral 912 denotes a wireless process unit for executing various sorts of process operations in order to transmit/receive a signal from/to the antenna 911 in a wireless manner. Also, reference numeral 913 indicates a channel code for encoding/decoding a signal.

Reference numeral 914 shows a data communication process unit for executing various sorts of process operations as to a signal communicated with respect to the main boards 104 and 105.

Figure 10:
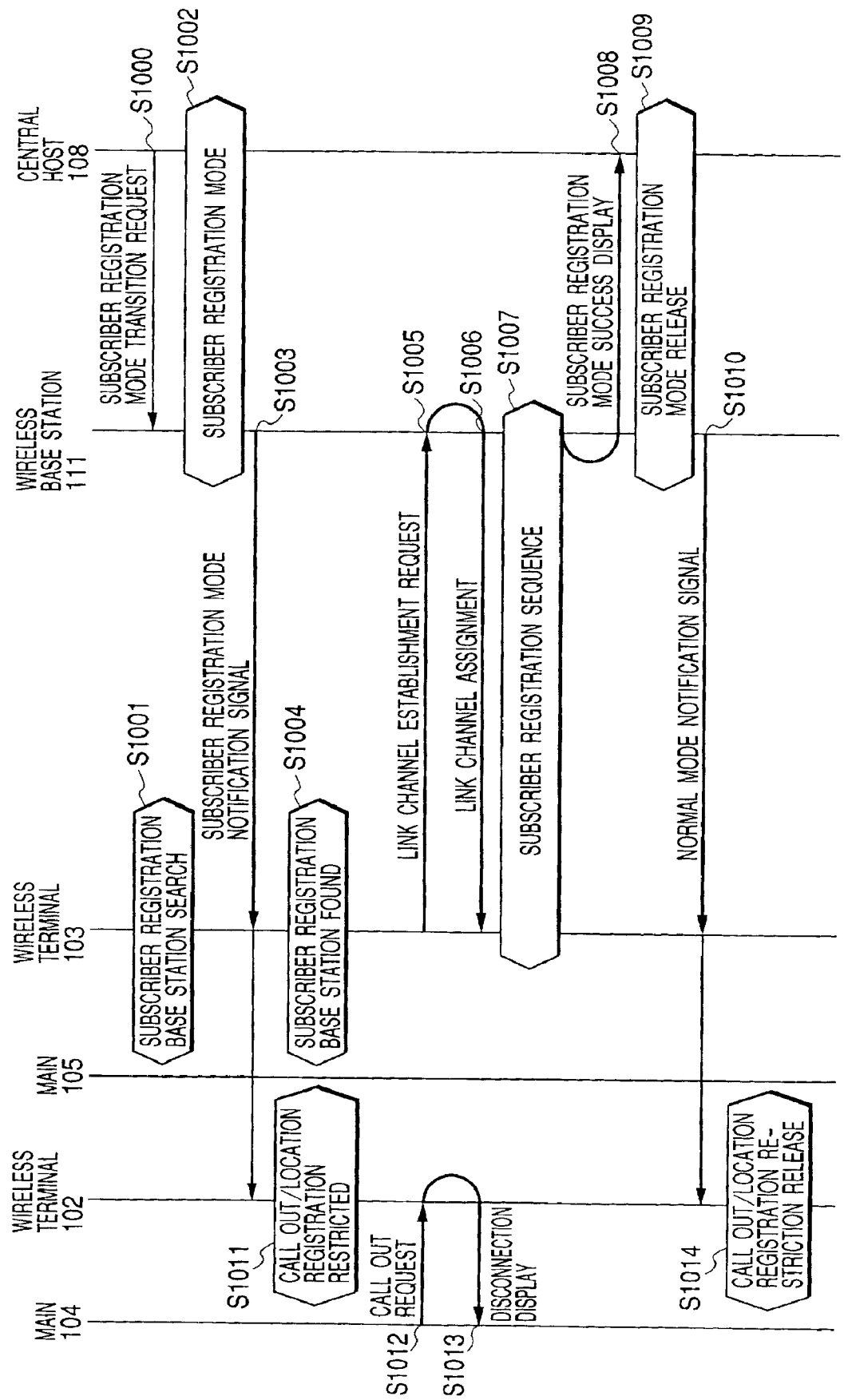
FIG. 10 is a sequence diagram for describing operations of a wireless communication system according to a third embodiment of the present invention.

FIG. 10 is a sequence diagram for representing such a case that the wireless terminal apparatus 103 operated under subscriber registration mode executes the subscriber registration process operation with respect to the wireless base station 111 in the subscriber registration mode, whereas the wireless terminal apparatus 102 whose subscriber registration operation has already been completed and which is operated under normal condition executes the call out restriction process operation when a call out request is received from the main board 104.

Figure 11A:
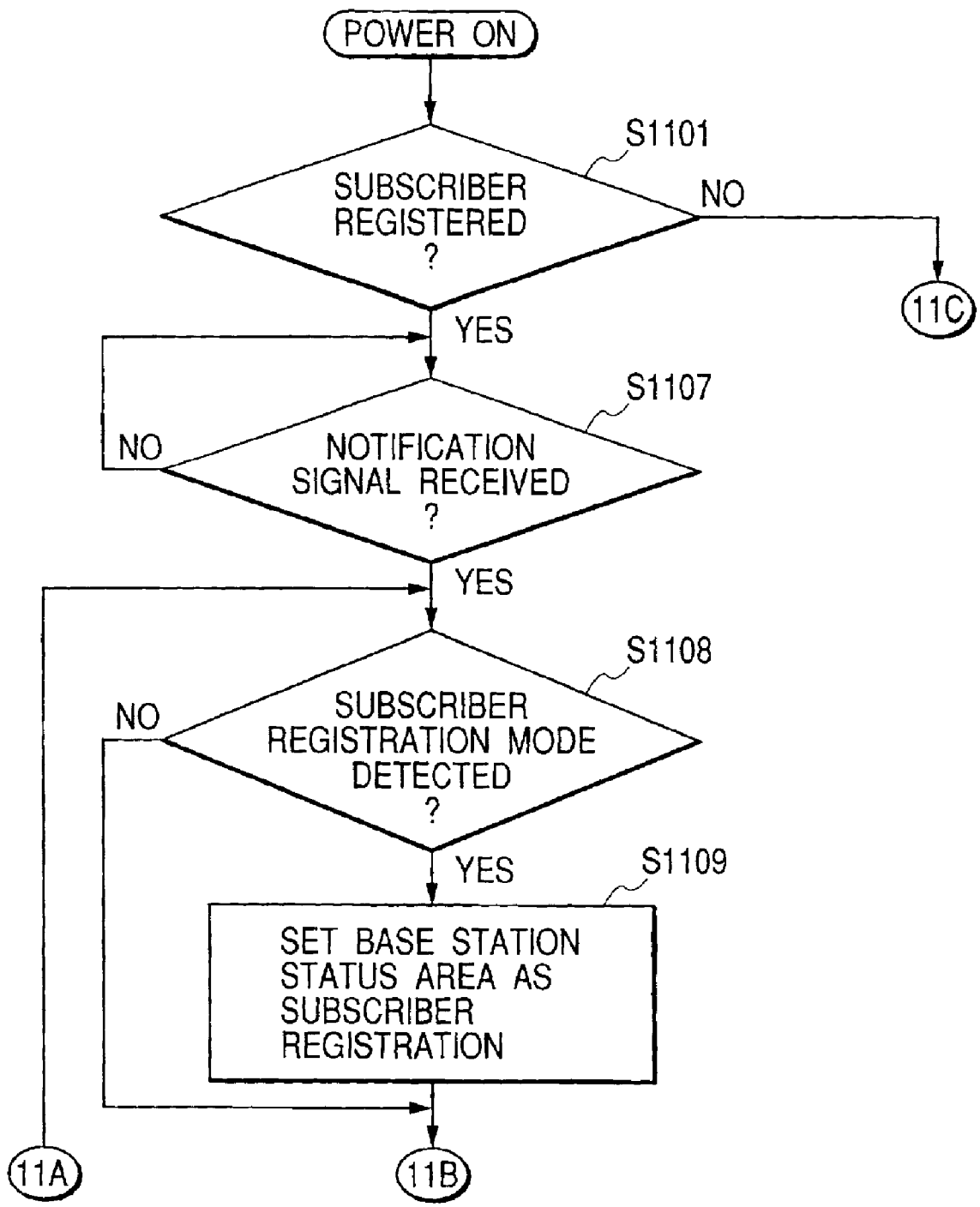
FIGS. 11A, 11B and 11C are flow charts for describing operations of the wireless terminal apparatus employed in the wireless communication system of the third embodiment.
Figure 11B:
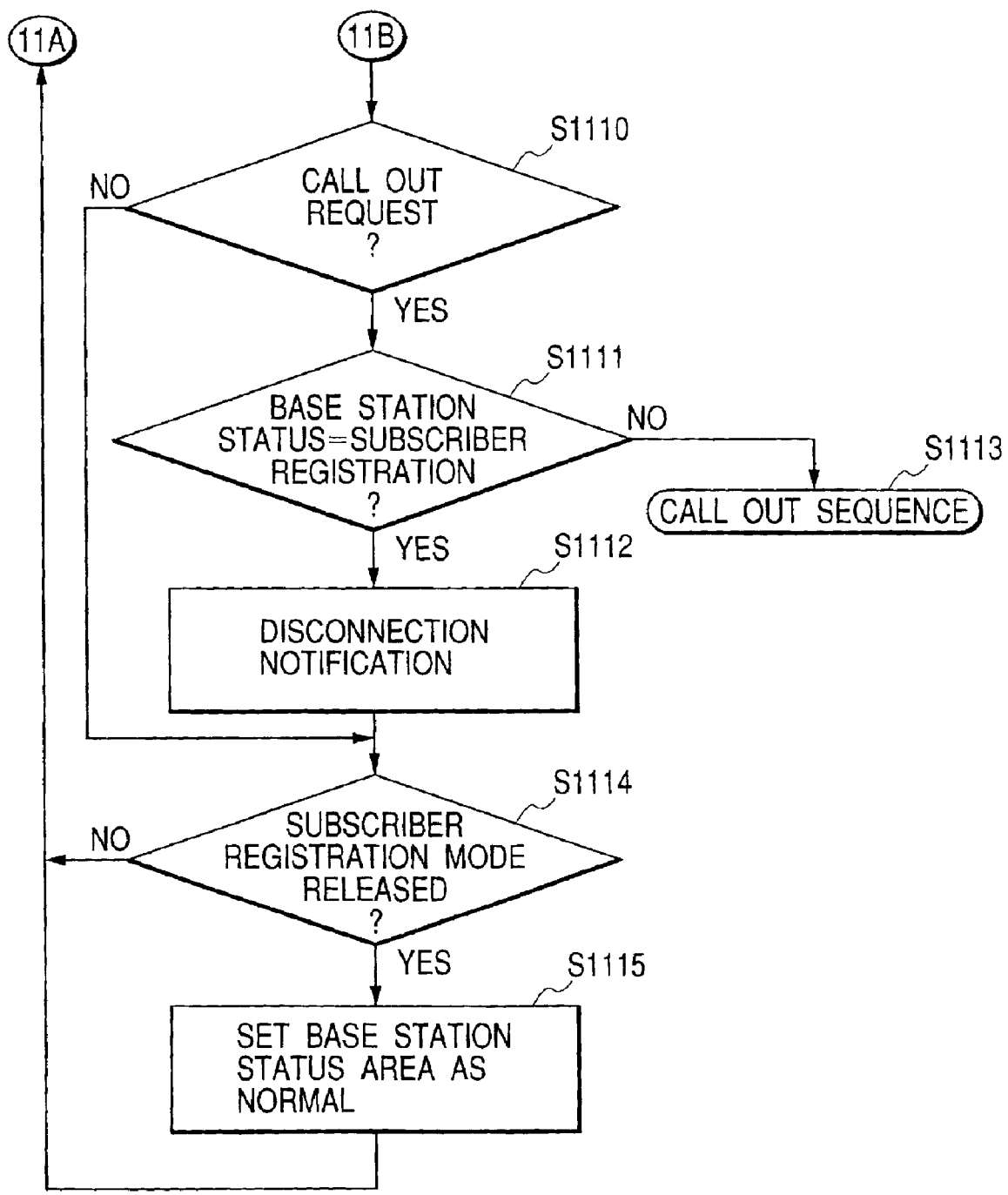
Figure 11C:
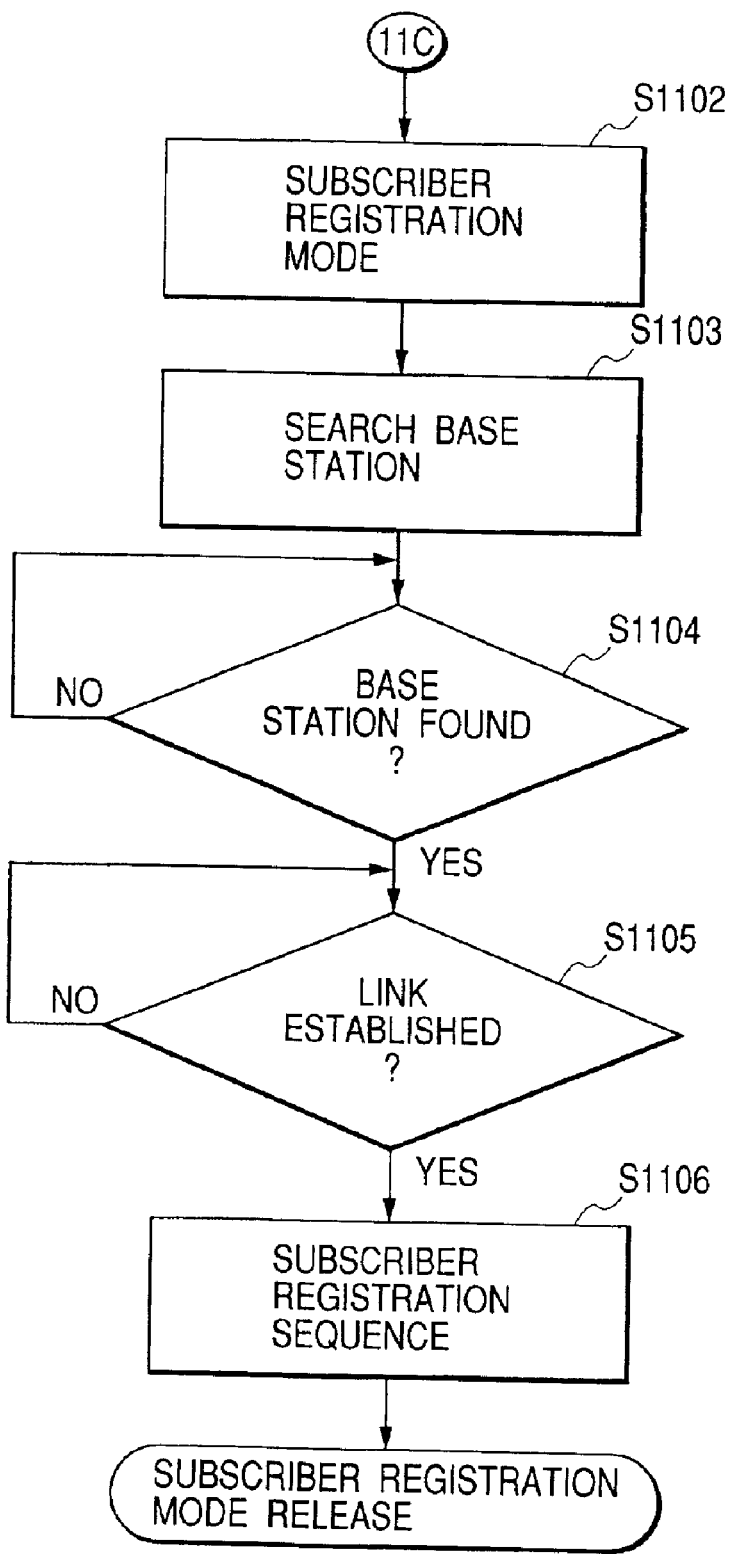

FIG. 11A to FIG. 11C are flow charts for explaining operation of the control unit 901 employed in the wireless terminal apparatus 102 and 103. This flow chart indicates a portion of a computer program which is stored in the memory 901M and is readable by the control unit 901. It should be understood that the wireless terminal apparatus 102 and 103, and the wireless base station 111 are operated as follows, since the control unit 901 and the control unit 301 execute the programs which are stored in the memory 901M and the memory 301M.

First, a subscriber registration mode transition request is issued from the host 108 with respect to the wireless base station 111 (step S1000).

The wireless base station 111 sets such a fact that the present mode is the subscriber registration mode into the restriction notification signal area 306 of the RAM 304, and the operation mode of this wireless base station 111 is transferred from the normal operation mode to the subscriber registration mode (step S1002). Then, the wireless base station 111 commences a transmission of a notification signal of the subscriber registration mode (step S1003). In other words, the wireless base station 111 transmits such a system information notification message 400 in which the bit 401 of FIG. 4B is set to "1", the bit 402 of FIG. 4C is set to "0", and the bit 403 is set to "0". In this case, the bit 401 of "1" (shown in FIG. 4B) indicates that this notification signal is equal to the notification signal of the subscriber registration mode. It should also be noted that in this third embodiment, since the wireless terminal apparatus 102 and 103 do not refer to the bits 402 and 403, these bits 402 and 403 may be freely set to "0", or "1".

Since the wireless terminal apparatus 103 has already accomplished the subscriber registration operation and is operated under the normal mode, when this wireless terminal apparatus 103 receives such a notification signal of the subscriber registration mode transmitted from the wireless base station 111 to which the wireless terminal apparatus 103 has been registered (steps S1101, S1107, and S1108), this wireless terminal apparatus 103 sets such a fact that the wireless base station 111 is operated under the subscriber registration mode into the base station status stored area 905 of the RAM 904 (step S1109). Then, the operation mode of the wireless terminal apparatus 103 is brought into such a call out/location registration restriction mode by which the call out/location registration operations are limited (step S1011).

It should also be noted that when the bit 401 (namely, bit for notifying as to whether or not wireless base station (CS) corresponds to a subscriber data writing station) shown in FIG. 4B is equal to such a subscriber data writing station (namely, "1"), the wireless terminal apparatus judges the subscriber registration mode.

In other words, when the call out request issued from the main board 104 is detected (step S1110), the wireless terminal apparatus 102 checks the setting content of the base station status stored area 905, and judges as to whether or not the status of the wireless base station 111 corresponds to the subscriber registration mode (step S1111). When the status of this wireless base station 111 corresponds to the subscriber registration mode, the wireless terminal apparatus 102 executes a disconnect process operation for notifying a disconnect display with respect to the main board 104 (step S1112).

To the contrary, in the case that the status of the wireless base station 111 does not correspond to the subscriber registration mode, the wireless terminal apparatus 102 executes a call out process operation with respect to the wireless base station 111 in response to a request issued from the main board 104 (step S1113).

It should also be noted that even when the location registration request is issued from the main board 104, the wireless terminal apparatus 102 transmits a disconnect display to the main board 104 so as to limit the location registration operation in a similar manner to the call out request.

Also, in the case that the received notification signal corresponds to the notification signal of the normal mode, namely, when the bit 401 of FIG. 4B indicates such a subscriber data not-writing station (namely "0"), the wireless terminal apparatus 102 judges that the subscriber registration mode of the wireless base station 111 is released (step S1114), and then, sets such a fact that the subscriber registration mode of the wireless base station 111 is released, namely the present mode is the normal mode into the base station status stored area 905 (step S1115). Thereafter, this wireless terminal apparatus 102 releases the call out/location registration restriction (step S1014).

Subsequently, the wireless terminal apparatus 102 accepts both a call out request and a location registration request, which are issued from the main board 104.

On the other hand, when the wireless terminal apparatus 103 judges that the subscriber registration has not yet been completed while the power supply is turned ON (step S1101), the operation mode of this wireless terminal apparatus 103 is automatically brought into the subscriber registration mode (step S1102), and also the wireless terminal apparatus 103 executes to retrieve such a wireless base station operated in the subscriber registration mode (steps S1001 and S1103).

Thereafter, when the wireless terminal apparatus 103 finds out such a wireless base station 111 which transmits the notification signal of the subscriber registration mode (steps S1004 and S1104), this wireless terminal apparatus 103 transmits a link channel establishment request to this wireless base station 111 (step S1005). When a link channel allocation is received from the wireless base station 111 (step S1006), this wireless terminal apparatus 103 establishes a link between the terminal apparatus 103 and the wireless base station 111 (step S1105), and then, executes the subscriber registration sequence between the terminal apparatus 103 and the wireless base station 111 (steps S1007 and S1106).

It should also be noted that when the bit 401 (namely, bit for notifying as to whether or not wireless base station (CS) corresponds to a subscriber data writing station) shown in FIG. 4B is equal to such a subscriber data writing station (namely, "1"), the wireless terminal apparatus judges the subscriber registration mode. wireless terminal apparatus 103 is accomplished, the wireless base station 111 notifies a success of the subscriber registration operation to the host 108 (step S1008), and executes the releasing operation of the subscriber registration mode (step S1009), and then, transmits the notification signal of the normal mode (step S1010). In other words, the wireless base station 111 transmits such a system information notification message 400 in which the bit 401 of FIG. 4A is set to "0", the bit 402 of FIG. 4C is set to "0", and the bit 403 is set to "0". In this case, the bit 401 of "0" shown in FIG. 4B represents that the subscriber registration mode is released. It should also be understood that since the wireless terminal apparatus 102 and 103 do not refer to the bits 402 and 403 in this third embodiment, these bits 402 and 403 may be freely selected to be "0", or "1".

Alternatively, both the releasing operation of the subscriber registration mode defined at the step S1009 and the transmission operation of the notification signal for notifying the normal mode defined at the step S1010 may be carried out by receiving an instruction sent from the host 108.

Also, when the subscriber registration operation is accomplished, the wireless terminal apparatus 103 releases the subscriber registration mode so as to carry out the normal communication.

In accordance with this third embodiment, in the case that the operation mode of the wireless base station is brought into the subscriber registration mode, this wireless base station can control that this wireless terminal apparatus does not transmit the wireless signal. As a result, while the useless traffics of the control channel can be avoided, this wireless communication system can contribute the effective utilization of the control channels.

Next, a description will now be made of a wireless communication system according to a fourth embodiment of the present invention. It should also be understood that an entire arrangement of this wireless communication system, an internal arrangement of a wireless base station 111, and internal arrangements of wireless terminal apparatus 102 and 103, according to this fourth embodiment, are similar to those disclosed in FIG. 1, FIG. 9, and FIG. 3, respectively.

FIG. 12 is a sequence diagram for representing operations of the wireless terminal apparatus 102 operated under normal condition in such a case that the wireless base station 111 is operated in the subscriber registration mode. It should be understood that since a process operation of the wireless terminal apparatus 103 for executing the subscriber registration process operation is similar to the above-explained process explained with reference to FIG. 10, a description of this process operation is omitted in the below-mentioned description.

Figure 13:
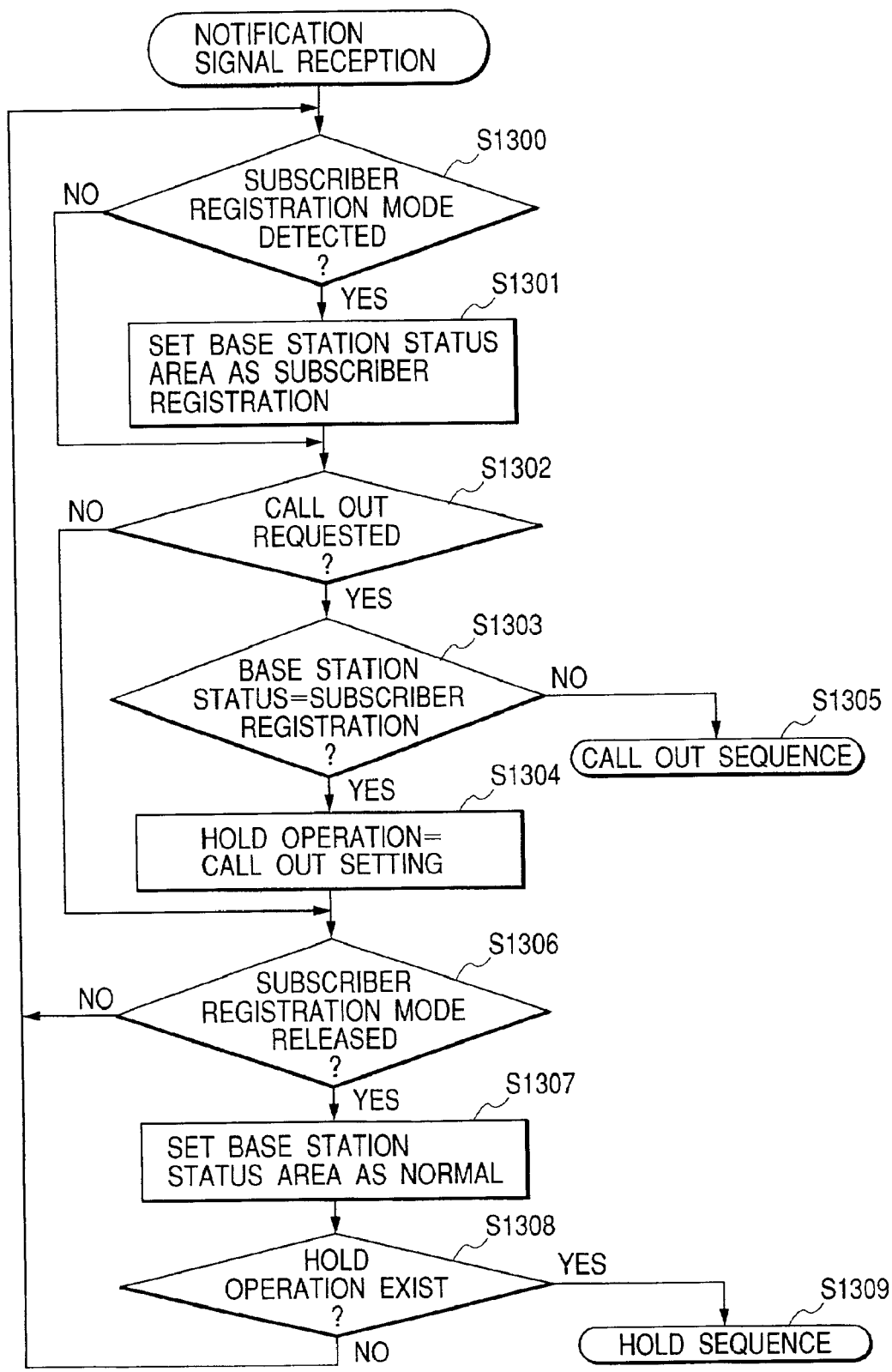
FIG. 13 is a flow chart for describing operations of the wireless terminal apparatus employed in the wireless communication system of the fourth embodiment.

Also, FIG. 13 is an operation flow chart for describing operations of the control unit 901 employed in the wireless terminal apparatus 102. This flow chart indicates a portion of a program which is stored into the memory 901M, and is readable by the control unit 901. It should also be noted that both the wireless terminal apparatus 102 and 103, and also the wireless base station 111 are operated as follows, since the control unit 901 and the control unit 301 execute programs which are stored in the memory 901M and the memory 301M.

First, the host 108 issues a subscriber registration mode transition request to the wireless base station 111 (step S1200).

In the wireless base station 111, the present operation mode thereof is transferred from the normal operation mode to the subscriber registration mode (step S1201). This wireless base station 111 starts to transmit a notification signal of this subscriber registration mode (step S1202). This notification signal is such a notification signal in which the bit 401 of FIG. 4B is equal to "1".

Since the wireless terminal apparatus 102 has already accomplished the subscriber registration operation and is operated in the normal mode, when the notification signal (namely, notification signal having bit 401 that is "1") of the subscriber registration mode sent from the wireless base station into which the wireless terminal apparatus 102 has been registered is received (step S1300), this wireless terminal apparatus 102 sets such a fact that the wireless base station is operated under the subscriber registration mode into the base station status stored area 905 of the RAM 904 (step S1301). The operation mode of the wireless terminal apparatus 102 is brought into the call out/location registration restriction mode by which the call out/location registration operations are limited (step S1203).

It should also be noted that when the bit 401 (namely, bit for notifying as to whether or not wireless base station (CS) corresponds to a subscriber data writing station) shown in FIG. 4B is equal to such a subscriber data writing station (namely, "1"), the wireless terminal apparatus judges the subscriber registration mode.

When the present operation mode is entered into the call out/location registration restriction mode, even if the call out request is issued from the main board 104 (step S1204), the wireless terminal apparatus 102 holds this call out request (step S1205) in order to restrict the call out operation, and restarts the reception of the notification signal.

In other words, when the call out request is issued from the main board 104 (step S1302), the wireless terminal apparatus 102 checks as to whether or not the set data of the base station status stored area 905 corresponds to the subscriber registration mode (step S1303). When this set data corresponds to the subscriber registration mode, the wireless terminal apparatus 102 sets this call out request as the hold operation (step S1304).

To the contrary, in the case that the status of the wireless base station 111 is not equal to the subscriber registration mode (namely, wireless terminal apparatus 102 is not operated under call out/location registration restriction mode), the wireless terminal apparatus 102 executes the call out sequence with respect to the wireless base station 111 in answer to this call out request (step S1305).

After the wireless base station 111 has accomplished the subscriber registration operation of such a wireless terminal apparatus whose subscriber registration has not yet been completed (namely, wireless terminal apparatus 103 and the like), this wireless base station 111 releases the subscriber registration mode (step S1206), and then, restarts to transmit the notification signal of the normal mode (namely, such a notification signal that bit 401 of FIG. 4B is equal to "0") (step S1207).

When the wireless terminal apparatus 102 receives the notification signal of the normal mode (namely, notification signal in which bit 401 is equal to "0") in which this subscriber registration mode is released (step S1306), the wireless terminal apparatus 102 sets such a fact that the subscriber registration mode of the wireless base station 111 is released into the base station status stored area 905, namely, sets such a fact that the operation mode of the wireless base station 111 corresponds to the normal mode (step S1307), and then, releases the call out/location registration restriction (step S1208).

Also, if there is such a call out set under hold operation at the same time when this call out/location registration restriction operations are released (step S1308), the wireless terminal apparatus 102 releases this hold operation of the call out (step S1209), and then, executes the call out sequence in order to commence the held call out (steps S1210 and S1309).

It should also be understood that this fourth embodiment has described the mode under which the call out process operation is held.

To the contrary, in accordance with a modification of the present invention, even when a location registration request is issued, the wireless terminal apparatus 102 holds this location registration request so as to restrict the signal transmission from the wireless terminal apparatus. Also, when the subscriber registration mode is released, if there is such a location registration under hold operation, then the wireless terminal apparatus executes the position registration operation.

As previously explained, in accordance with this fourth embodiment, in such a case that the wireless base station 111 is operated in the subscriber registration mode, this wireless base station 111 may apply such a restriction to the wireless terminal apparatus 102 in such a manner that this wireless terminal apparatus 102 holds to transmit the wireless signal. Also, when the transmission operation is held and the wireless base station releases the subscriber registration mode, this wireless base station immediately commences the process operation set under holding condition. As a result, the main board 104 need not control the timer and the like, but can execute other tasks thereof.

Alternatively, a transmission process operation such as a data packet executed from a wireless terminal apparatus to a wireless base station may be restricted in the wireless communication system according to the present invention.

Also, in another modification, such a condition under transmission restriction is displayed on a wireless terminal apparatus operated under transmission restriction, by which a user is notified. In accordance with this modification, the following problem may be avoided. That is, although the user issues the call out request, errors happen to occur many times, so that this user misunderstands that the wireless terminal apparatus is brought into the malfunction.

While the wireless communication system according to the present invention has been described based upon the various preferred embodiments, the present invention is not limited to those embodiments, but may be modified, changed, and substituted without departing from the technical scope of the invention.

That is to say, in the foregoing descriptions, while the communication control apparatus 100 and 101 are separately arranged by employing the wireless terminal apparatus 102/103, and the main boards 104/105, the process operations of the wireless terminal apparatus 102/103 are mainly explained. Alternatively, the transmission restrictions according to the present invention may be carried out on the side of the main boards 104/105 of the communication control apparatus 100/101. Also, while the central managing apparatus 106 is separately arranged by employing the wireless base station 111 and the main board 115, the wireless base station 111 controls the notification signal. Alternatively, this notification signal control operation may be carried out on the side of the main board 115 of the central managing apparatus 110.

What is claimed is:

1. A registering method for registering a communication apparatus which has not been registered, comprising:
   a restriction step of restricting, in a registration mode for registering the communication apparatus which has not been registered, a transmission of a signal transmitted from the communication apparatus which has already been registered, wherein a base station signal is transmitted in the registration mode from a base station to the communication apparatus for restricting the communication apparatus from transmitting the signal when the communication apparatus has been registered in the registration mode.

2. A registering method as claimed in claim 1 wherein:

said restriction step restricts a transmission of a signal used to produce an outgoing call from the communication apparatus which has already been registered in said registration mode.

3. A registering method as claimed in claim 1 wherein:

said restriction step restricts the transmission of the signal from the communication apparatus which has already been registered in response to the base station signal.

4. A registering method as claimed in claim 1 wherein:

in said restriction step, the base station transmits any one of a first base station signal and a second base station signal depending on whether or not the registration mode is set; said first base station signal is used to restrict the transmission of the signal from the communication apparatus which has already been registered; and said second base station signal is used not to restrict the transmission of the signal from the communication apparatus which has already been registered.

5. A registering method as claimed in claim 1 wherein:

in said restriction step, the communication apparatus which has already been registered sets a restriction mode for restricting the transmission of the signal in response to a base station signal which is transmitted by a base station in the registration mode.

6. A registering method as claimed in claim 5, wherein the communication apparatus determines that the restriction mode has been set and, accordingly, places a call request on hold even if the call request has been issued by an internal component of the communication apparatus.

7. A registering method as claimed in claim 1 wherein:

in said restriction step, the communication apparatus which has already been registered restricts the transmission of the signal in response to a base station signal which is transmitted by a base station in accordance with an instruction for setting the registration mode issued from a host which is connected via a network.

8. A registering method as claimed in claim 1 wherein:

said signal, the transmission of which is restricted in said restriction step, is transmitted upon releasing of the registration mode.

9. A communication system comprising a base station for transmitting a base station signal; and a communication apparatus, wherein when the communication apparatus has not been registered, the communication apparatus performs a communication for registration with the base station in response to the base station signal from the base station, and when the communication apparatus has been registered, the communication apparatus is restricted from transmitting a signal in response to the base station signal which is transmitted from the base station in a registration mode for registering the communication apparatus which has not been registered.

10. A communication system as claimed in claim 9 wherein:

the base station transmits any one of a first base station signal and a second base station signal depending on whether or not the registration mode is set; said first base station signal is used to restrict the transmission of the signal from the communication apparatus which has already been registered; and said second base station signal is used not to restrict the transmission of the signal from the communication apparatus which has already been registered.

11. A communication system as claimed in claim 9 wherein:

the communication apparatus which has already been registered restricts the transmission of the signal in response to the base station signal which is transmitted by a base station in accordance with an instruction for setting the registration mode issued from a host which is connected via a network.

12. A base station comprising:

communication means for performing a communication for a registration with a communication apparatus which has not been registered; and transmission means for transmitting, in a registration mode for registering the communication apparatus which has not been registered, a base station signal for restricting the communication apparatus from transmitting a signal when the communication apparatus has been registered.

13. A base station as claimed in claim 12 wherein:

said transmission means transmits any one of a first base station signal and a second base station signal depending on whether or not the registration mode is set; said first base station signal is used to restrict the transmission of the signal from the communication apparatus which has already been registered; and said second base station signal is used not to restrict the transmission of the signal from the communication apparatus which has already been registered.

14. A base station as claimed in claim 12 wherein:

said transmission means transmits the base station signal which restricts the transmission of the signal from the communication apparatus which has already been registered in accordance with an instruction for setting the registration mode issued from a host which is connected via a network.

15. A communication apparatus comprising:

communication means for performing a communication for a registration with a base station in response to a base station signal; and restriction means for restricting when the registration has been accomplished, the communication apparatus from transmitting a signal in response to the base station signal transmitted from the base station in a registration mode for registering a communication apparatus which has not been registered.

16. A program used for a base station, comprising:

a first program step of performing a communication for registration with a communication apparatus which has not been registered; and a second program step of transmitting, in a registration mode for registering the communication apparatus which has not been registered, a base station signal for restricting the communication apparatus from transmitting a signal when the communication apparatus has been registered.

17. A program as claimed in claim 16 wherein:

in said second program step, any one of a first base station signal and a second base station signal is transmitted depending on whether or not the registration mode is set; said first base station signal is used to restrict the transmission of the signal from the communication apparatus which has already been registered; and said second base station signal is used not to restrict the transmission of the signal from the communication apparatus which has already been registered.

18. A program as claimed in claim 16 wherein:

in said second program step, in response to an instruction for setting a registration mode issued from a host connected via a public line, the base station signal is transmitted which restricts a transmission of a signal from a communication apparatus which has been registered.

19. A program used for a communication apparatus, comprising:

a first program step of performing a communication for registration with a base station in response to a base station signal; and a second program step of restricting, when a registration has been completed, the communication apparatus from transmitting a signal in response to the base station signal transmitted from the base station in a registration mode for registering a communication apparatus which has not been registered.

20. A communication system comprising a communication apparatus and a base station, wherein:

said base station is connected via a network to a host, and transmits a base station signal in response to a request issued from the host for setting a registration mode for registering the communication apparatus which has not been registered; and wherein said communication apparatus has been registered, said communication apparatus is restricted from transmitting a signal in response to the base station signal transmitted from said base station in the registration mode.

21. A communication system as claimed in claim 20 wherein:

said base station selects any one of a first base station signal and a second base station signal; said first base station signal restricts a transmission of a signal from the communication apparatus; and said second base station signal does not restrict the transmission of the signal from the communication apparatus.

22. A base station comprising:

reception means for receiving a request from a host connected via a network for setting a registration mode for registering a communication apparatus which has not been registered; and transmission means for transmitting in response to the request issued from said host for setting the registration mode, a base station signal for restricting the communication apparatus from transmitting a signal when the communication apparatus has been registered.

23. A base station as claimed in claim 22 wherein:

said transmission means selects any one of a first base station signal and a second base station signal; said first base station signal restricts a transmission of a signal from the communication apparatus; and said second base station signal does not restrict the transmission of the signal from the communication apparatus.

24. A signal transmission restricting method comprising:

a reception step of receiving a request from a host via a network for setting a registration mode for registering a communication apparatus which has not been registered; and a transmission step of transmitting, in response to the request issued from said host for setting the registration mode, a base station signal for restricting the communication apparatus from transmitting a signal when the communication apparatus has been registered.

25. A signal transmission restricting method as claimed in claim 24 wherein:

said transmission step selects any one of a first base station signal and a second base station signal; said first base station signal restricts a transmission of a signal from the communication apparatus; and said second base station signal does not restrict the transmission of the signal from the communication apparatus.

26. A signal transmission restricting program, comprising:

a first program step of receiving a request from a host connected via a network for setting a registration mode for registering a communication apparatus which has not been registered; and a second program step of transmitting in response to the request issued from said host for setting the registration mode, a base station signal for restricting the communication apparatus from transmitting a signal when the communication apparatus has been registered.

27. A signal transmission restricting program, as claimed in claim 26 wherein:

said second program step selects any one of a first base station signal and a second base station signal; said first base station signal restricts a transmission of a signal from the communication apparatus; and said second base station signal does not restrict the transmission of the signal from the communication apparatus.

* * * * *